US012808999B2

(12) United States Patent
Ono et al.

(10) Patent No.: US 12,808,999 B2
(45) Date of Patent: Nov. 24, 2026

(54) MEMS DEVICE AND DISTANCE MEASURING APPARATUS

(71) Applicant: LINFINEL LLC, Nagano (JP)

(72) Inventors: Tomoki Ono, Tokyo (JP); Tsubasa Sugiyama, Tokyo (JP)

(73) Assignee: LINFINEL LLC, Nagano (JP)

( * ) Notice: Subject to any disclaimer, the term of this patent is extended or adjusted under 35 U.S.C. 154(b) by 300 days.

(21) Appl. No.: 18/834,076

(22) PCT Filed: Jan. 17, 2023

(86) PCT No.: PCT/JP2023/001162

§ 371 (c)(1),
(2) Date: Jul. 29, 2024

(87) PCT Pub. No.: WO2023/149196

PCT Pub. Date: Aug. 10, 2023

(65) Prior Publication Data

US 2025/0123369 A1 Apr. 17, 2025

(30) Foreign Application Priority Data

Feb. 7, 2022 (JP) ................................ 2022-016833

(51) Int. Cl.
*G01S 7/481* (2006.01)

(52) U.S. Cl.
CPC .................................. *G01S 7/4817* (2013.01)

(58) Field of Classification Search
CPC . G01S 7/4817; G02B 26/101; G02B 26/0858; G02B 26/0833; G02B 26/105; B81B 2201/042
See application file for complete search history.

(56) References Cited

U.S. PATENT DOCUMENTS 11,175,491 B2 * 11/2021 Baran ........................ G01L 1/18
2008/0198433 A1 * 8/2008 Ueyama ............. G02B 26/0858
359/198.1

(Continued)

FOREIGN PATENT DOCUMENTS

JP 2008-203299 A 9/2008
JP 2013-003474 A 1/2013

(Continued)

OTHER PUBLICATIONS

International Search Report and Written Opinion of PCT Application No. PCT/JP2023/001162, issued on Apr. 4, 2023, 09 pages of ISRWO.

(Continued)

*Primary Examiner* — Kenneth J Malkowski
(74) *Attorney, Agent, or Firm* — Huan-Yi Lin

(57) ABSTRACT

The accuracy of distance measurement is improved, for example.
The MEMS device includes a mirror, an actuator, a first beam extending in a direction of a horizontal rotation axis and connected to the mirror, a ring-shaped beam connected to the first beam, a second beam extending in a direction of a vertical rotation axis and connected to the ring-shaped beam, and a third beam having a first connection part positioned substantially in the middle thereof, the third beam further having a second connection part and a third connection part positioned at both ends thereof, the third beam being connected to the second beam via the first connection part. Both ends of the third beam are connected to the actuator individually via the second connection part and the third connection part. In a case where L0 denotes a minimum distance from the first connection part to the second connection part and from the first connection part to the third connection part as connected by a line substantially parallel to the horizontal rotation axis and by a line substantially (Continued)

100 parallel to the vertical rotation axis, and where N0 represents the number of bends of approximately 90 degrees each, a path length L from the first connection part to the second connection part and from the first connection part to the third connection part along the third beam is greater than L0, and the number of bends N is larger than N0.

12 Claims, 37 Drawing Sheets

(56) References Cited

U.S. PATENT DOCUMENTS

| | | | | |
|---|---|---|---|---|
| 2019/0250273 | A1* | 8/2019 | Honkanen | G01S 17/10 |
| 2021/0396990 | A1* | 12/2021 | Bella | G01S 7/4817 |

FOREIGN PATENT DOCUMENTS

| | | | |
|---|---|---|---|
| JP | 2019-535014 | A | 12/2019 |
| JP | 2021-071583 | A | 5/2021 |
| WO | 2007/074821 | A1 | 7/2007 |

OTHER PUBLICATIONS

Gu-Stoppel, et al., "Piezoelectrically Driven and Sensed Micromirrors with Extremely Large Scan Angles and Precise Closed-Loop Control", Proceedings 2017, 1, 561, Aug. 16, 2017, 4 pages.

* cited by examiner

MEMS DEVICE AND DISTANCE MEASURING APPARATUS

CROSS REFERENCE TO RELATED APPLICATIONS

This application is a U.S. National Phase of International Patent Application No. PCT/JP2023/001162 filed on Jan. 17, 2023, which claims priority benefit of Japanese Patent Application No. JP 2022-016833 filed in the Japan Patent Office on Feb. 7, 2022. Each of the above-referenced applications is hereby incorporated herein by reference in its entirety.

TECHNICAL FIELD

The present disclosure relates to a MEMS (Micro Electro Mechanical Systems) device and a distance measuring apparatus.

BACKGROUND ART

PTL 1 discloses a distance measuring system that measures the distance to a distance measuring target (abbreviated as the target hereunder where appropriate). Further, NPL 1 discloses a MEMS device.

CITATION LIST

Patent Literature

[PTL 1]
JP-T-2019-535014
[NPL 1]
Piezoelectrically Driven and Sensed Micromirrors with Extremely Large Scan Angles and Precise Closed-Loop Control tShanshan Gu-Stoppel, Thorsten Giese, Hans-Joachim Quenzer, Ulrich Hofmann and Wolfgang Benecke, Published: 16 Aug. 2017, Proceedings 2017, 1, 561; doi:10.3390/proceedings1040561 www.mdpi-.com/journal/proceedings

SUMMARY

Technical Problem

In such a field, it is desired to widen the range of distance measurement and improve the accuracy thereof.

An object of the present disclosure is to provide a MEMS device capable of widening the range of distance measurement and improving the accuracy thereof, and a distance measuring apparatus that includes the MEMS device.

Solution to Problem

According to the present disclosure, there is provided, for example, a MEMS device including a mirror, an actuator, a first beam extending in a direction of a horizontal rotation axis and connected to the mirror, a ring-shaped beam connected to the first beam, a second beam extending in a direction of a vertical rotation axis and connected to the ring-shaped beam, and a third beam having a first connection part positioned substantially in the middle thereof, the third beam further having a second connection part and a third connection part positioned at both ends thereof, the third beam being connected to the second beam via the first connection part. Both ends of the third beam are connected to the actuator individually via the second connection part and the third connection part. In a case where L0 denotes a minimum distance from the first connection part to the second connection part and from the first connection part to the third connection part as connected by a line substantially parallel to the horizontal rotation axis and by a line substantially parallel to the vertical rotation axis, and where N0 represents the number of bends of approximately 90 degrees each, a path length L from the first connection part to the second connection part and from the first connection part to the third connection part along the third beam is greater than L0, and the number of bends N is larger than N0.

According to the present disclosure, there is also provided, for example, a distance measuring apparatus including a MEMS device, a laser light source, a light receiving section, and a measuring section configured to measure a distance to a distance measuring target on the basis of time of flight of a laser beam emitted from the laser light source. The MEMS device includes a mirror, an actuator, a first beam extending in a direction of a horizontal rotation axis and connected to the mirror, a ring-shaped beam connected to the first beam, a second beam extending in a direction of a vertical rotation axis and connected to the ring-shaped beam, and a third beam having a first connection part positioned substantially in the middle thereof, the third beam further having a second connection part and a third connection part positioned at both ends thereof, the third beam being connected to the second beam via the first connection part. Both ends of the third beam are connected to the actuator individually via the second connection part and the third connection part. In a case where L0 denotes a minimum distance from the first connection part to the second connection part and from the first connection part to the third connection part as connected by a line substantially parallel to the horizontal rotation axis and by a line substantially parallel to the vertical rotation axis, and where N0 represents the number of bends of approximately 90 degrees each, a path length L from the first connection part to the second connection part and from the first connection part to the third connection part along the third beam is greater than L0, and the number of bends N is larger than N0.

DESCRIPTION OF EMBODIMENT

Figure 1:
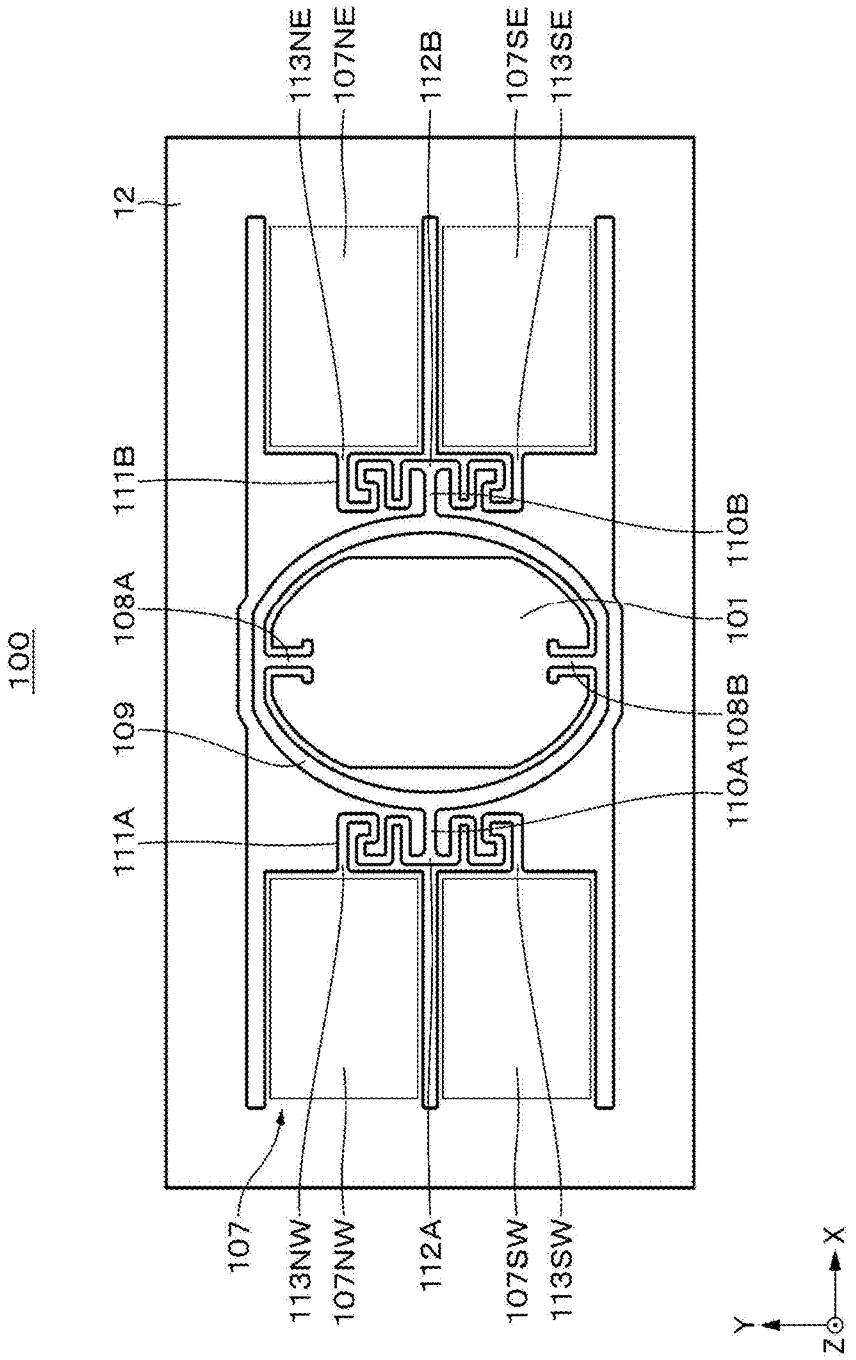
FIG. 1 is a view for explaining a MEMS device as one embodiment.

A preferred embodiment and variants of the present disclosure are described below with reference to the accompanying drawings. It is to be noted that the description will be given in the following order:

Background of the Present Disclosure

Embodiment

Variants

The preferred embodiment and variants, to be described below, are only specific examples of the present disclosure and are not limitative of the disclosure. It is to be noted that, in the drawings, the shades of colors and the patterns such as hatching have no particular meaning unless otherwise noted. Further, for purpose of explanation, the drawings may be simplified and only parts of the configurations thereof may be designated by reference signs, as appropriate.

Background of the Present Disclosure

To help understanding of the present disclosure, the background of the present disclosure is explained first. Distance sensors based on the time-of-flight measurement method (referred to as TOF (Time of Flight) hereunder where appropriate) are used for topographic measurement, management of structures, automated navigation, and failure inspection on production lines, as well as in diverse applications such as sports, entertainment, and art. The pulse width of laser provides measurable time resolution. Since the speed of light is constant, the pulse width of laser contributes to the resolution of distance to be measured. For example, in the case where the speed of light is $3\times10^8$ m/s, if the resolution of time is 1 nanosecond, the resolution of distance is 15 cm, and if the resolution of time is 1 picosecond, the resolution of distance is 0.15 mm.

A coaxial optical system, which involves irradiating the target with a laser pulse by two-axis scanning using a scanning element before receiving scattered light from the target via the scanning element, provides a compact and highly accurate position measuring setup. For this reason, the coaxial optical system is frequently adopted by distance sensors based on the TOF method. A solenoid-driven galvanometer mirror or a small-sized MEMS mirror is appropriate as the scanning element. Some galvanometer mirrors may have a mirror area of 100 $mm^2$ or more, which is sufficiently larger than the cross-sectional area of an emission laser beam. Consequently, if the optical system allows the galvanometer mirror to reflect scattered light from the target before separating the light from the emission laser beam by using a holed mirror or the like, the system still has a large receiving aperture size, which permits measurement of distances exceeding 100 m.

Meanwhile, galvanometer mirrors with their low sweep speed offer a low point group density in the case of a light source having a single light emitting point. Small-sized MEMS mirrors have a high sweep speed and thus can provide a high point group density. However, the mirror diameter is as small as a few millimeters, which shortens the maximum measurable distance.

PTL 1 cited above describes a coaxial optical system that uses a plurality of MEMS mirrors. A MEMS mirror at the center emits a laser beam to the target, which returns scattered light to be deflected by a plurality of MEMS mirrors around the central mirror in the directions of respective light receiving elements. These MEMS mirrors are synchronously controlled and can be handled as a quasi-coaxial optical system. Further, compared with systems that use a single MEMS mirror, this system offers a large receiving aperture size. Meanwhile, a performance index of the MEMS mirror is given by the product of a mirror diameter, a vibration frequency, and a deflection angle. Obtaining a high performance index requires raising a Q value through resonant operation. In resonant operation, the vibration frequency and the deflection angle are known to be affected by variability of semiconductor processes. As a result, it is not easy synchronously to drive a plurality of MEMS mirrors at the same resonance frequency and with a desired deflection angle. In particular, synchronous driving of MEMS mirrors is not suitable for applications requiring smaller size and lower cost. The centers of rotation of a plurality of MEMS mirrors are different, which in no small measure can pose problems of multi-axis optical systems in which the distances from respective light receiving elements to the target are different. That is, in applications that require a distance accuracy of a few millimeters or thereabouts, it is necessary to individually correct information representing the time of flight from each of the light receiving elements with respect to the target position. Consequently, the technology described in PTL 1 has room for improvement in increasing the accuracy of distance measurement.

NPL 1 cited above describes the use of one single-axis MEMS mirror achieving a good balance between a large mirror diameter and deflection angle. On both sides of a beam on a rotation axis are actuators each including a piezoelectric element. A beam connecting the right and left actuators and the beam on the rotation axis are connected with each other. With the MEMS mirror vacuum-sealed, there is no damping by air, which permits resonant operation with a high Q value. Such a configuration is characterized by a long beam length on the rotation axis and by high torsion. Appropriating such a configuration for a two-axis MEMS mirror involves enlarging the external shape of a ring to which the beams are connected, increasing inertial moment relative to an added rotation axis, and thereby reducing the deflection angle. In the case where the expensive vacuum sealing is not carried out for usage in the atmosphere, the deflection angle is further reduced. With the above perspective taken into account, one preferred embodiment of the present disclosure is explained below in detail.

Embodiment

[Overall Configuration Example of the MEMS Device]

A MEMS device (MEMS device 100) as one embodiment is explained with reference to FIG. 1. The MEMS device 100 is formed by use of an SOI (silicon-on-insulator) substrate, for example. A frame, to be discussed later, includes a silicon substrate, an insulation layer, and a silicon device layer. Inside the frame, each part includes the silicon device layer, with the silicon substrate and the insulation layer removed. An actuator, to be discussed later, is a piezoelectric element, for example. Electrodes located above and below the piezoelectric element are each led to the frame and connected to a predetermined MEMS drive device. A first beam and a second beam, to be discussed later, may have their bases furnished with a piezoelectric element each for measuring torsion. The electrodes positioned above and below the piezoelectric element are each led to the frame. Alternatively, a piezoelectric element for measuring warpage may be provided on a side of the actuator. The electrodes positioned above and below the piezoelectric element are each led to the frame.

A specific configuration example of the MEMS device 100 is explained here. Schematically, the MEMS device 100 includes a mirror 101, a frame 12 to which the mirror 101 is connected, actuators 107, first beams 108A and 108B, a ring-shaped beam 109, second beams 110A and 110B, and snake beams 111A and 111B.

Schematically, the mirror 101 has an H-shape (elliptical shape). The mirror 101 measures approximately 4 mm in the horizontal direction by 6 mm in the vertical direction, for example. The dimensions of the mirror 101 are not limited to the above measurements. For example, the mirror 101 may measure approximately 3 mm by 10 mm. The mirror 101, not limited to any specific shape, may preferably be circular, elliptical, or free-form in shape. As will be discussed later in detail, a laser beam passing through the center of a concave surface mirror is reflected at the center of the mirror 101. Meanwhile, scattered light of the laser beam from the distance measuring target is reflected by the entire surface of the mirror 101, before being focused by the concave surface mirror to pass through an aperture for incidence on a light receiving element.

The mirror 101 is connected to two locations (opposite to each other) of the first beams 108A and 108B extending in a horizontal rotation axis (Y-axis direction in which the mirror 101 rotates horizontally) direction. At least either the first beam 108A or the first beam 108B corresponds to the first beam described in the appended claims. The first beams 108A and 108B are connected to the ring-shaped beam 109. The ring-shaped beam 109 is arranged to surround the mirror 101. The ring-shaped beam 109 is connected to two locations (opposite to each other) of the second beams 110A and 110B extending in a vertical rotation axis (X-axis direction in which the mirror 101 rotates vertically) direction.

The second beam 110A is positioned at approximately 90 degrees relative to the first beams 108A and 108B, for example. The second beam 110B is also positioned at approximately 90 degrees relative to the first beams 108A and 108B, for example. At least either the second beam 110A or the second beam 110B corresponds to the second beam described in the appended claims.

The second beam 110A is connected to the bellows-shaped snake beam 111A via a first connection part 112A. The first connection part 112A includes a boundary between the second beam 110A and the snake beam 111A, for example, signifying a region including the approximate center of the snake beam 111A. Further, the second beam 110B is connected to the bellows-shaped snake beam 111B via a first connection part 112B. The first connection part 112B includes a boundary between the second beam 110B and the snake beam 111B, for example, signifying a region including the approximate center of the snake beam 111B. At least either the snake beam 111A or the snake beam 111B corresponds to the third beam described in the appended claims. It is to be noted that, in the case where there is no need to distinguish the snake beams from one another, they will be generically referred to as the snake beams 111 hereunder where appropriate. Further, at least either the first connection part 112A or the first connection part 112B corresponds to the first connection part described in the appended claims. It is to be noted that, in this description, the term snake beam is used to signify an intricately bent beam.

The actuators 107 include, for example, two actuators (actuators 107NW and 107SW) positioned on one side (left side in FIG. 1) in the X-axis direction and two actuators (actuators 107NE and 107SE) positioned on the other side (right side in FIG. 1) in the X-axis direction. It is to be noted that, in the case where there is no need to distinguish the actuators from one another, they will be generically referred to as the actuators 107 hereunder where appropriate.

Both ends of the snake beams are connected to the actuators. For example, one end of the snake beam 111A is connected to the actuator 107NW, and the other end of the snake beam 111A is connected to the actuator 107SW. Specifically, one end of the snake beam 111A is connected to the actuator 107NW via a second connection part 113NW, and the other end of the snake beam 111A is connected to the actuator 107SW via a third connection part 113SW.

Also, for example, one end of the snake beam 111B is connected to the actuator 107NE, and the other end of the snake beam 111B is connected to the actuator 107SE. Specifically, one end of the snake beam 111B is connected to the actuator 107NE via a second connection part 113NE, and the other end of the snake beam 111B is connected to the actuator 107SE via a third connection part 113SE. At least either the second connection part 113NW or the second connection part 113NE corresponds to the second connection part described in the appended claims. Further, at least either the third connection part 113SW or the third connection part 113SE corresponds to the third connection part described in the appended claims.

Here, a path length L is assumed to exist from the first connection part 112A, which connects the second beam 110A with the snake beam 111A, to the second connection part 113NW, which is one connection part connecting the snake beam 111A with the actuator 107NW. In this case, the same path length L exists from the first connection part 112A to the third connection part 113SW, which is the other connection part connecting the snake beam 111A with the actuator 107SW.

Also, the same path length L exists from the first connection part 112B, which connects the second beam 110B with the snake beam 111B, to the second connection part 113NE, which is one connection part connecting the snake beam 111B with the actuator 107NE. Further, the same path length L exists from the first connection part 112B to the third connection part 113SE, which is the other connection part connecting the snake beam 111B with the actuator 107SE.

For example, suppose that L0 denotes a minimum distance from the first connection part 112A to the second connection part 113NW as connected only by a beam (line) parallel to the horizontal rotation axis and by a beam (line) parallel to the vertical rotation axis, and that N0 stands for the number of bends of approximately 90 degrees each. In this case, the path length L of the snake beams 111 is greater than L0, and the number of bends N of the snake beams 111 is larger than N0. It is to be noted that it is assumed that the number of bends of 180 degrees is counted as 2 and that the number of bends of 225 degrees is counted as 2.5.

For example, in the case of the configuration depicted in FIG. 1, the path length L is given approximately as 2.5×L0. Further, the number of bends N0 is counted as 2 (see FIG. 5, to be discussed later), and the number of bends N is counted as 10.

The actuators 107 have a lower electrode layer, a PZT (lead zirconate titanate) layer, and an upper electrode layer stacked in that order on a thermally oxidized film on the device layer surface of the SOI substrate, for example. The PZT layer is etched to the actuator shape. Only the actuators 107 and sensor regions, to be discussed later, are left intact while the rest is removed. The piezoelectric element is not limited to PZT and may include KNN:(K, Na)$NbO_3$ free of lead, which is an environmentally hazardous substance. The material of the piezoelectric element is not limited to anything specific.

The mirror 101 has a gold film (Au) placed on the device layer surface of the SOI substrate, for example. This configuration provides a high reflectance ratio at a laser wavelength (e.g., 830 nm). Depending on the laser wavelength in use, the material of the film such as aluminum (Al) or silver (Ag) deposited on the device layer surface of the SOI substrate can be changed as needed. Further, the film thus deposited may be a multilayer film that combines a plurality of dielectric films or a multilayer film combining a dielectric film and a metal film. The thermally oxidized film on the substrate surface may be removed or thinned out as needed in consideration of the flatness of the mirror 101.

The frame 12 includes a substrate, a BOX layer, a device layer, and the like on the SOI substrate, for example. There is a space with no frame 12 under the mirror 101 and under the actuators 107.

[Operation of the MEMS Device]

Figure 2A:
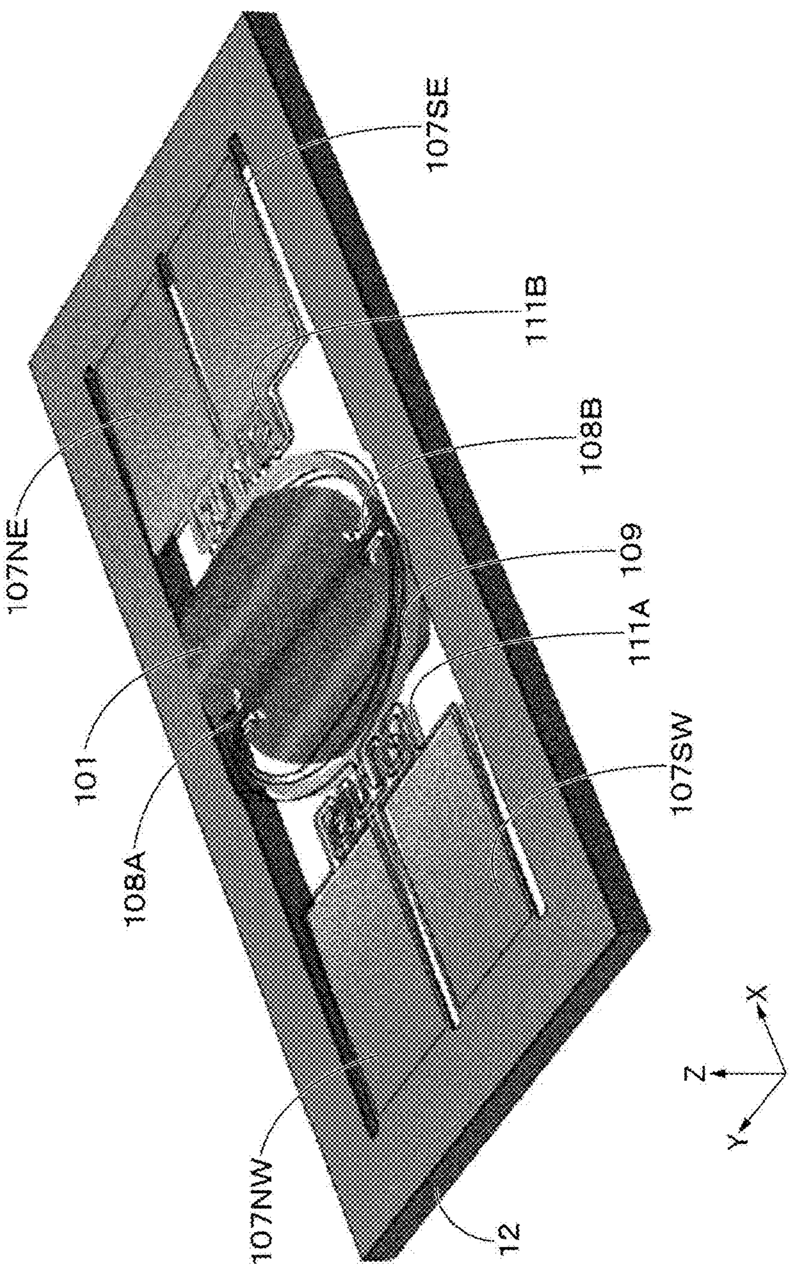
FIG. 2A is a perspective view depicting an example of a horizontal vibration of the MEMS device of the embodiment.
Figure 2B:
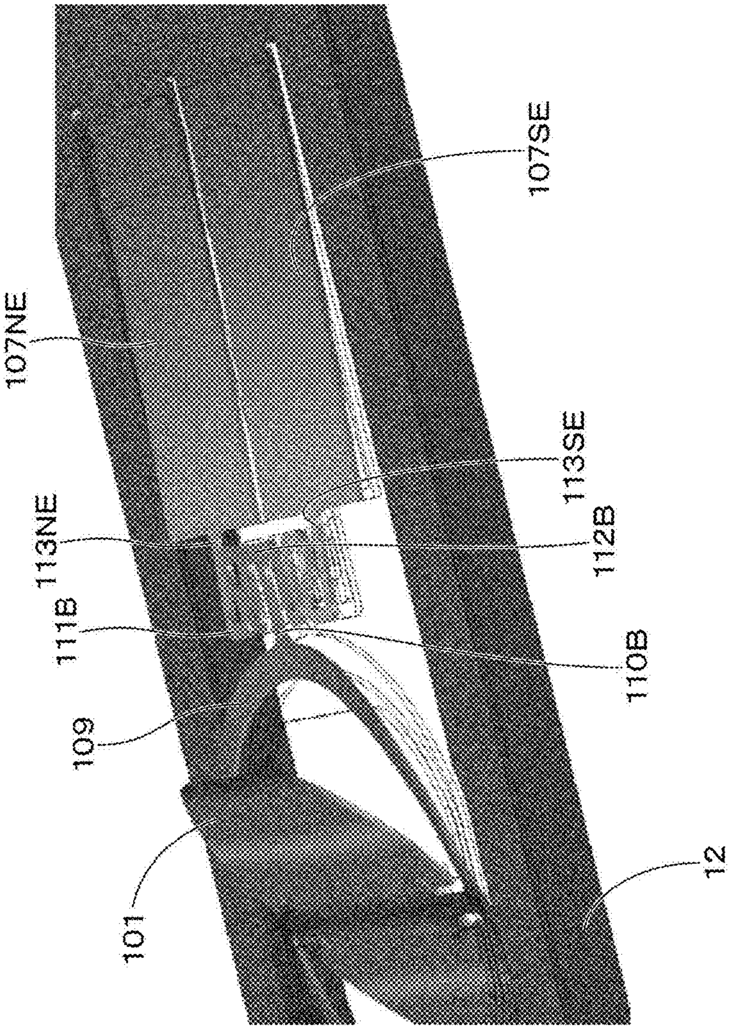
FIG. 2B is an enlarged view depicting the example of the horizontal vibration of the MEMS device of the embodiment.
Figure 2C:
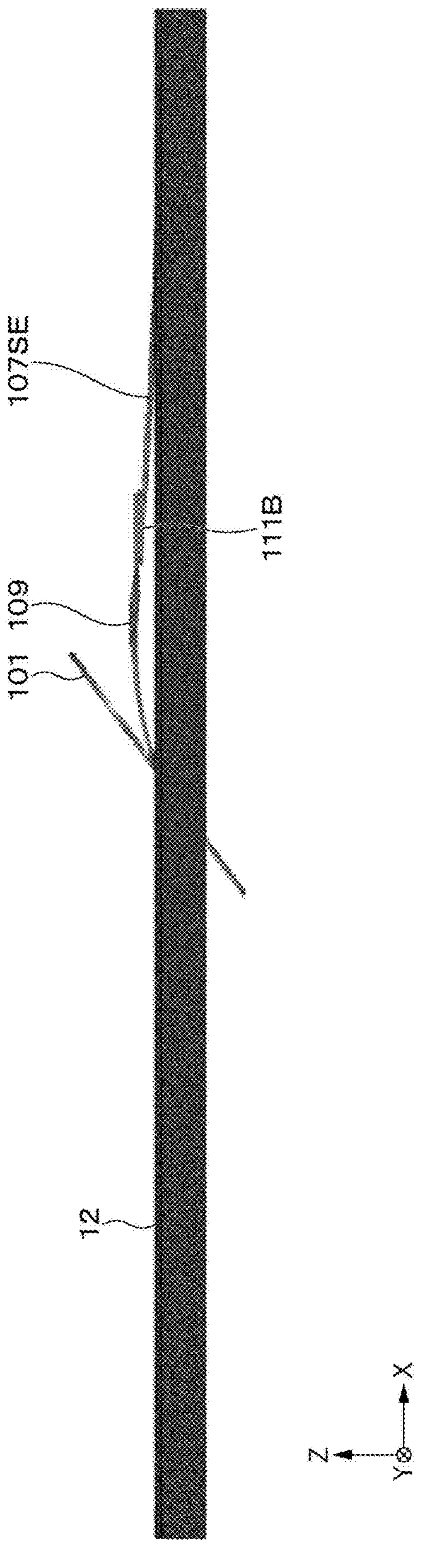
FIG. 2C is a side view depicting the example of the horizontal vibration of the MEMS device of the embodiment.

The operation of the MEMS device 100 as one embodiment is schematically explained here with reference to FIGS. 2A, 2B, 2C, 3A, 3B, and 3C. When the actuators 107NE and 107SE are driven in a phase and the actuators 107NW and 107SW are driven in a phase opposite to the phase of a drive signal for driving the actuators 107NE and 107SE, horizontal torsional vibrations occur around the horizontal rotation axis. FIGS. 2A, 2B, and 2C illustrate how horizonal torsional vibrations take place.

Figure 3A:
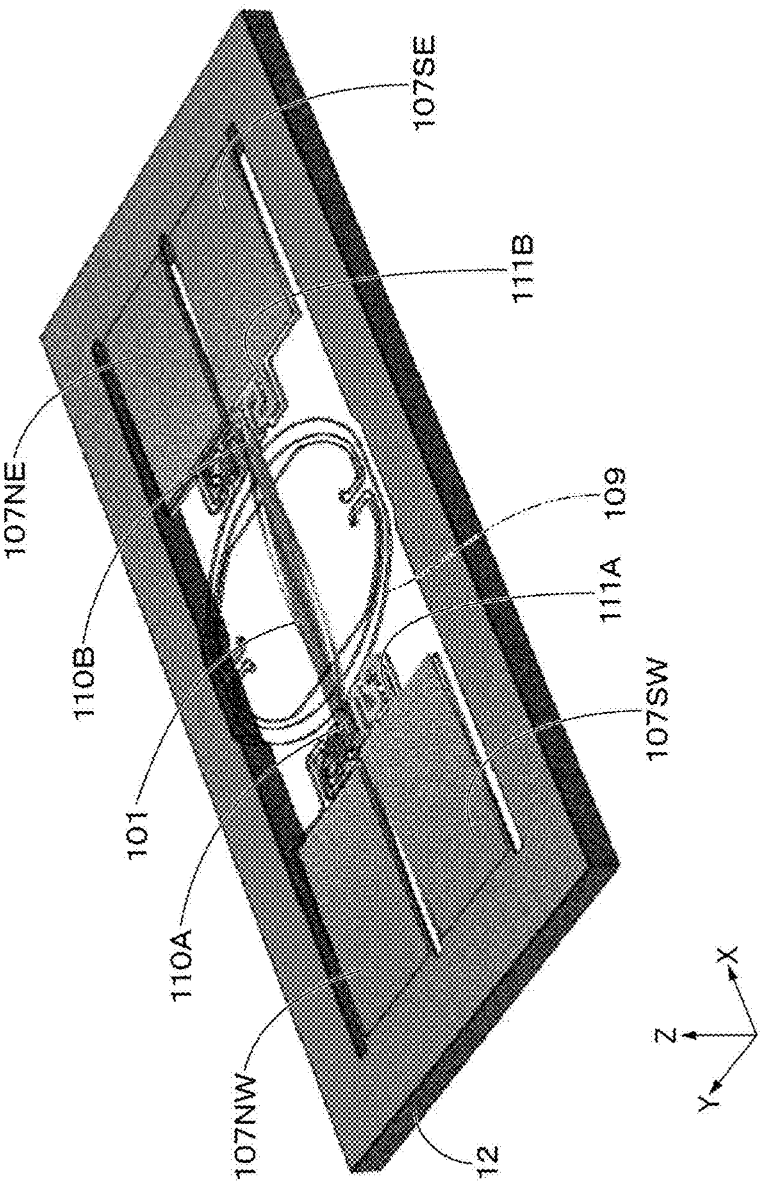
FIG. 3A is a perspective view depicting an example of a vertical vibration of the MEMS device of the embodiment.
Figure 3B:
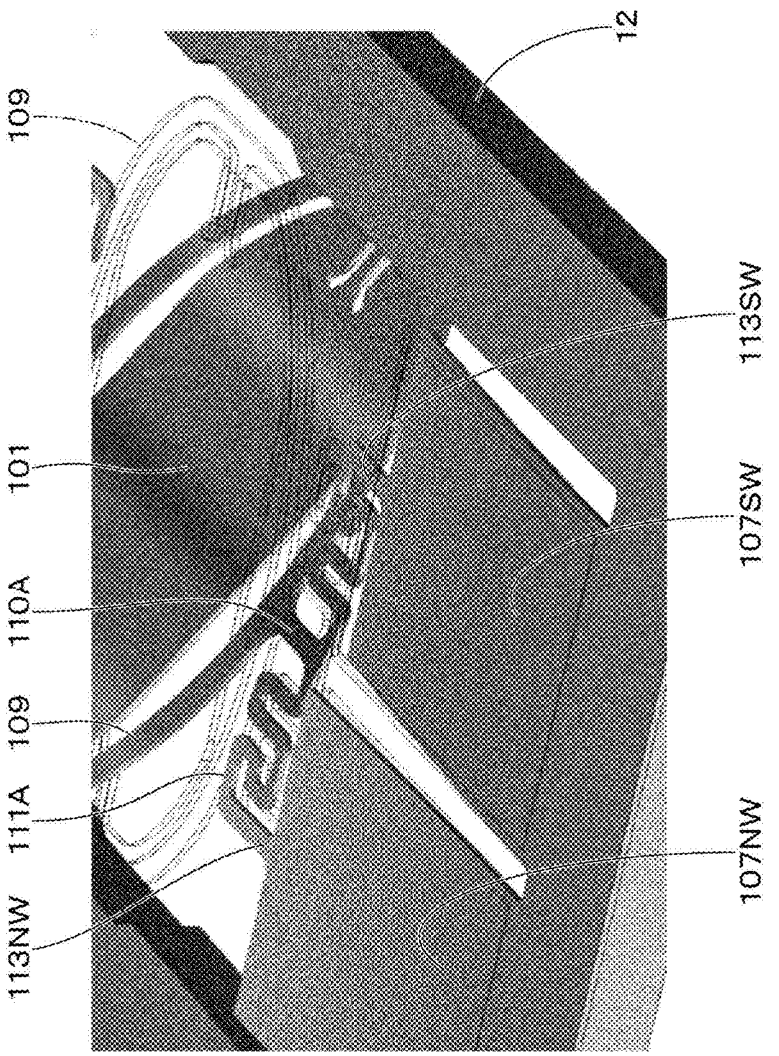
FIG. 3B is an enlarged view depicting the example of the vertical vibration of the MEMS device of the embodiment.
Figure 3C:
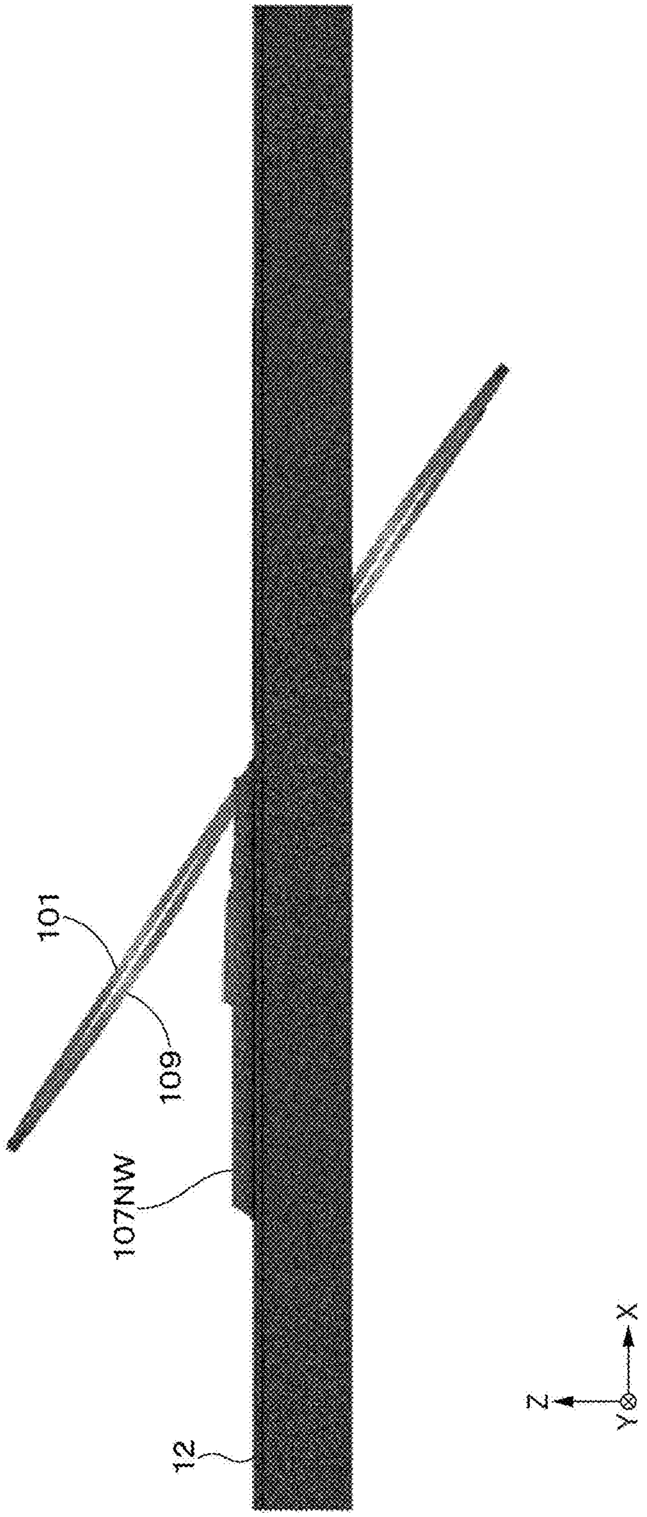
FIG. 3C is a side view depicting the example of the vertical vibration of the MEMS device of the embodiment.

Also, when the actuators 107NE and 107NW are driven in a phase and the actuators 107SE and 107SW are driven in a phase opposite to the phase of a drive signal for driving the actuators 107NE and 107NW, vertical torsional vibrations occur around the vertical rotation axis. FIGS. 3A, 3B, and 3C illustrate how vertical torsional vibrations take place. Combining the horizontal torsional vibrations with the vertical torsional vibrations allows the mirror 101 to vibrate two-dimensionally in a desired direction.

[Effects]

Figure 4A:
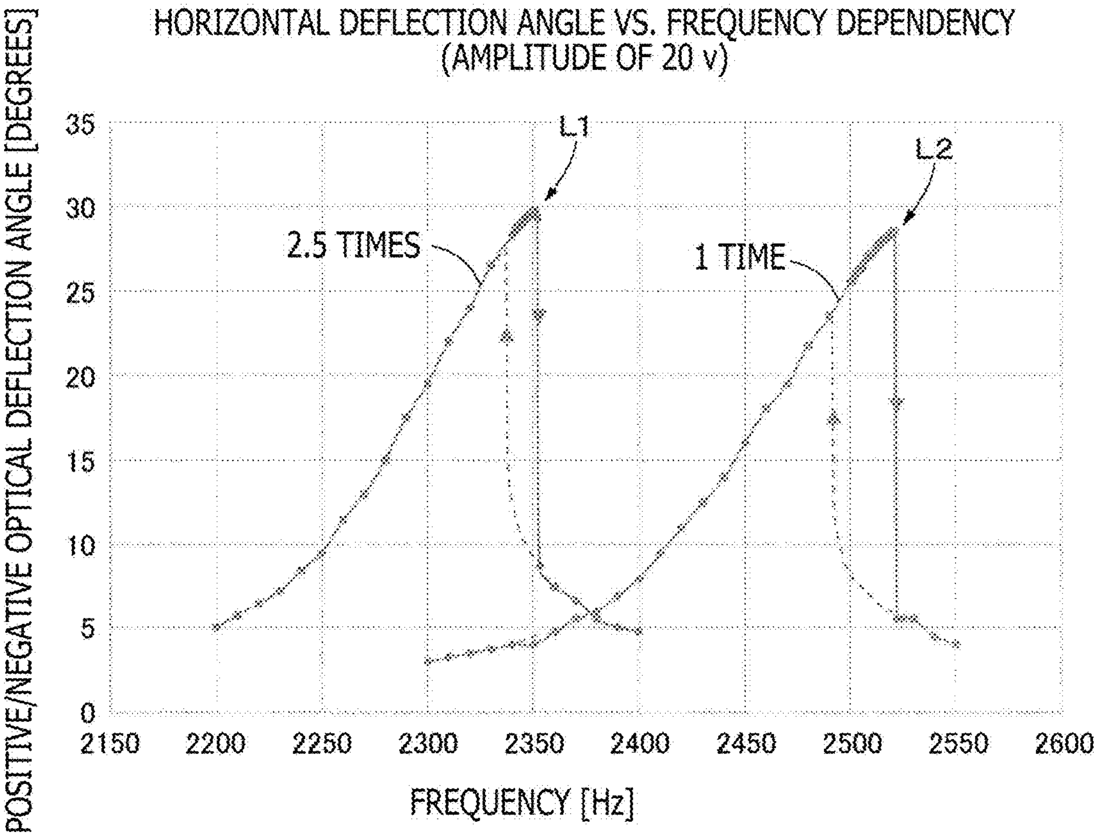
FIG. 4A is a graphic representation depicting a horizontal vibration frequency versus optical deflection angle dependency regarding each of the MEMS device of the embodiment and a comparable MEMS device.
Figure 4B:
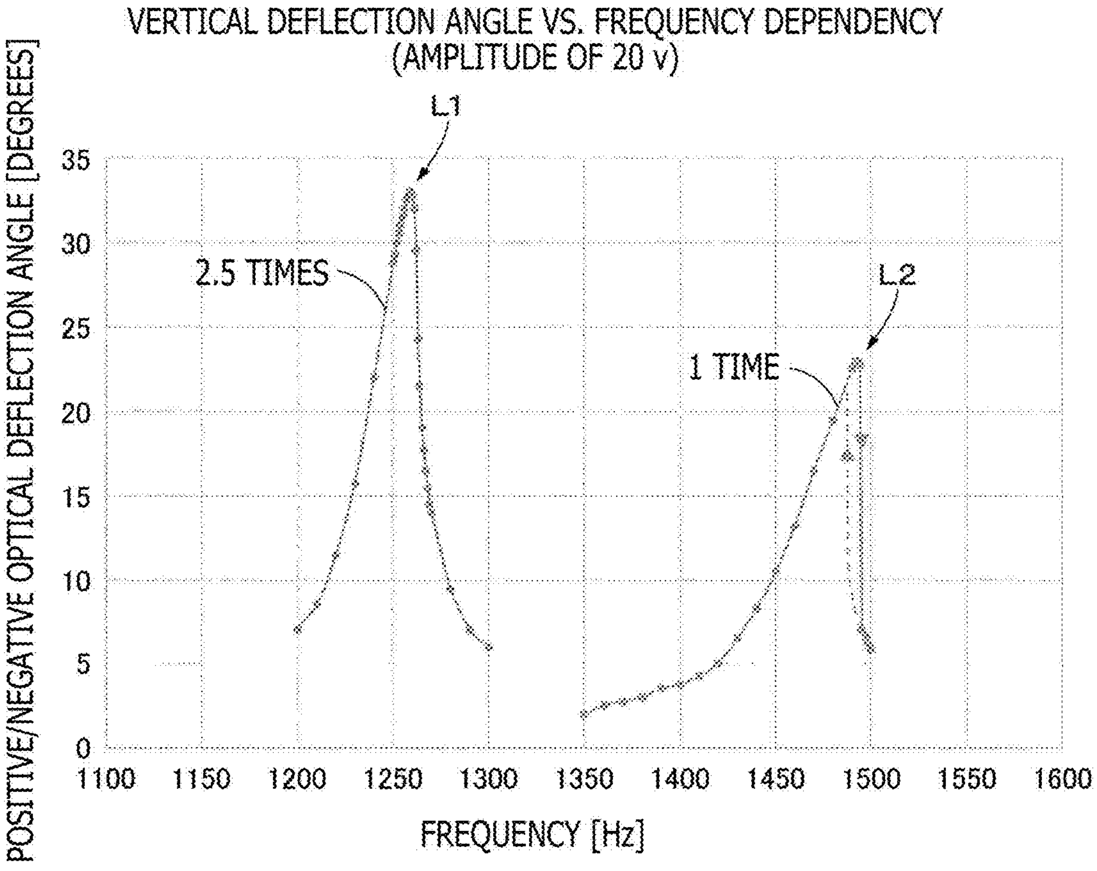
FIG. 4B is a graphic representation depicting a vertical vibration frequency versus optical deflection angle dependency regarding each of the MEMS device of the embodiment and the comparative MEMS device.

Exemplary effects obtained by the MEMS device 100 of the embodiment configured as described above are explained here. When driven at or near a natural resonance frequency, the MEMS device 100 in horizontal and vertical torsional vibrations produces resonant torsion providing a large deflection angle. FIG. 4A depicts experimental results of horizontal torsional vibration frequencies (on the horizontal axis, in Hz) and optical deflection angles (on the vertical axis, in degrees) observed in the case where a voltage of 20 V is applied to the actuators 107. Further, FIG. 4B illustrates experimental results of vertical torsional vibration frequencies (on the horizontal axis, in Hz) and optical deflection angles (on the vertical axis, in degrees) observed in the case where the voltage of 20 V is applied to the actuators 107.

In FIG. 4A, a line L1 on the low frequency side indicates the experimental results of the MEMS device 100 of the embodiment, whereas a line L2 on the high frequency side represents the experimental results of a comparative MEMS device without snake beams, where L=L0 and N0=2. On each of the lines, solid-line segments denote the case where frequencies are gradually increased from the low frequency side, and broken-line segments represent the case where frequencies are gradually lowered from the high frequency side. Such a hysteresis is known as a characteristic of a stiff spring. In the MEMS device 100 of the embodiment, the hysteresis is considered to be reduced by the spring being softened with the snake beams. In FIG. 4B, a line L1 on the low frequency side depicts the experimental results of the MEMS device 100 of the embodiment, while a line L2 on the high frequency side represents the experimental results of a comparative MEMS device devoid of snake beams, where L=L0 and N0=2. The influence of the snake beams appears more conspicuously in vertical torsional vibrations than in horizontal torsional vibrations. That is, the optical deflection angle is larger along the line L1 than along the line L2, with no hysteresis present.

The snake beams 111 of the embodiment are effective in suppressing mechanical interference of the four actuators 107. In horizontal torsional vibrations, the east (E) actuator and the west (W) actuator move in opposite phase to each other, which exerts a pulling force in the X-axis direction on the MEMS device 100 besides exciting its vertical torsional vibrations in the Y-axis direction. The snake beams 111 ease the pulling force. In vertical torsional vibrations, the north (N) actuator and the south (S) actuator move in opposite phase to each other, which exerts a pulling force in the Y-axis direction on the MEMS device 100 besides exciting its horizontal torsional vibrations in the X-axis direction. In particular, the north (N) and south (S) piezoelectric elements are adjacent to each other, reinforcing the pulling force and suppressing movements of the parts furnished with the piezoelectric elements. The snake beams 111 ease the pulling force.

Adding up and applying horizontal and vertical drive voltages to usage produces two-axis torsional vibrations. The snake beams 111A and 111B, despite their limited occupied areas, efficiently convert up-down movements of the actuators 107 into two-axis torsional motions. The force of pulling in the X- and Y-axis directions in two-axis torsional vibrations is similar to the force of pulling in single-axis torsional vibrations. These pulling forces are eased by the snake beams. This provides large optical deflection angles, enabling widening of the range of distance measurement.

Figure 5:
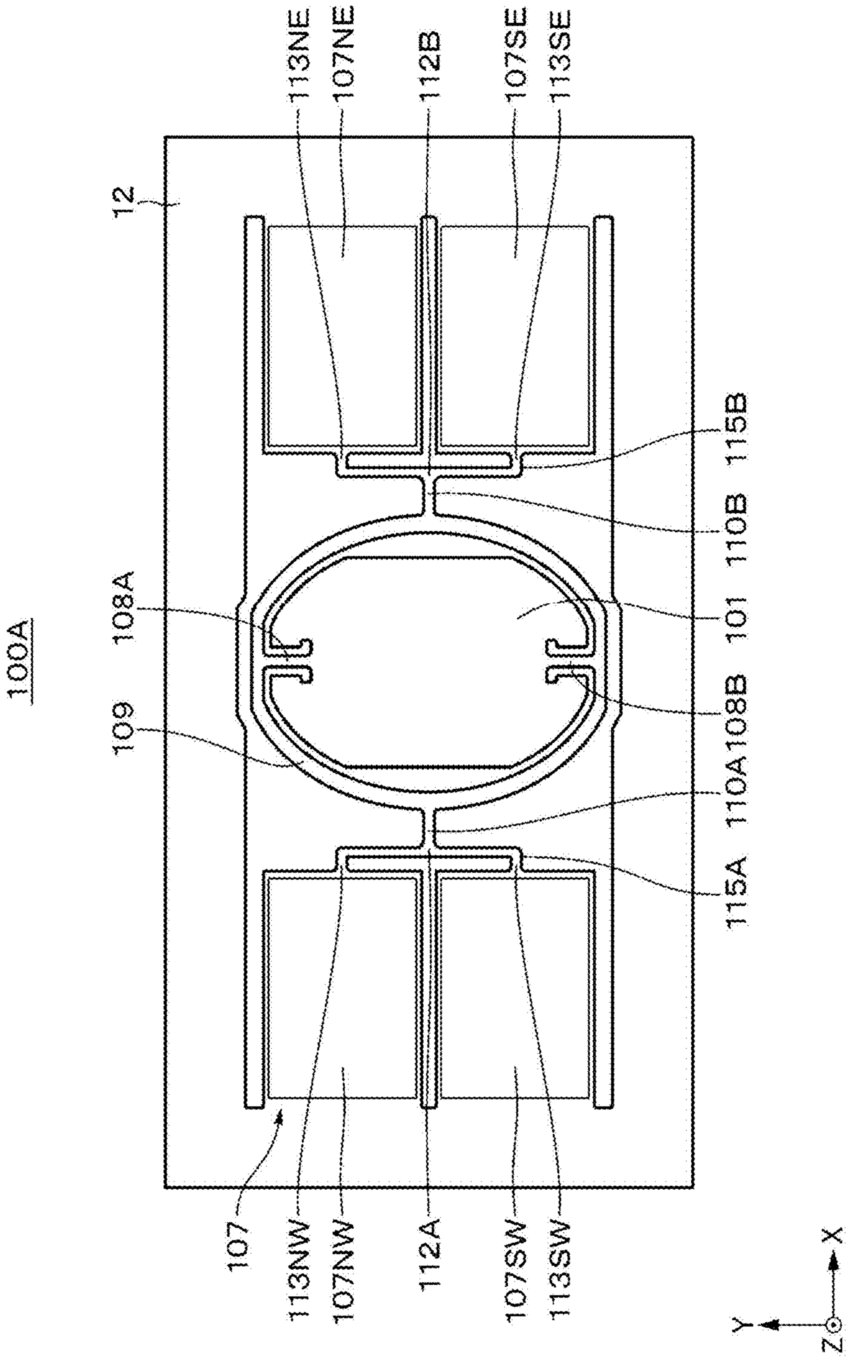
FIG. 5 is a view for explaining the comparative MEMS device.

In comparison with the MEMS device without snake beams, the snake beams 111 are verified for their effects. FIG. 5 depicts the comparative MEMS device (MEMS device 100A). As illustrated in FIG. 5, the second beam 110A is connected to a beam 115A. The beam 115A is connected to the actuator 107NW via the second connection part 113NW and to the actuator 107SW via the third connection part 113SW. Further, the second beam 110B is connected to a beam 115B. The beam 115B is connected to the actuator 107NE via the second connection part 113NE and to the actuator 107SE via the third connection part 113SE. The MEMS device 100A configured as described above has the path length L of L0 (minimum distance) and the number of bends of N0 (two bends).

Figure 6A:
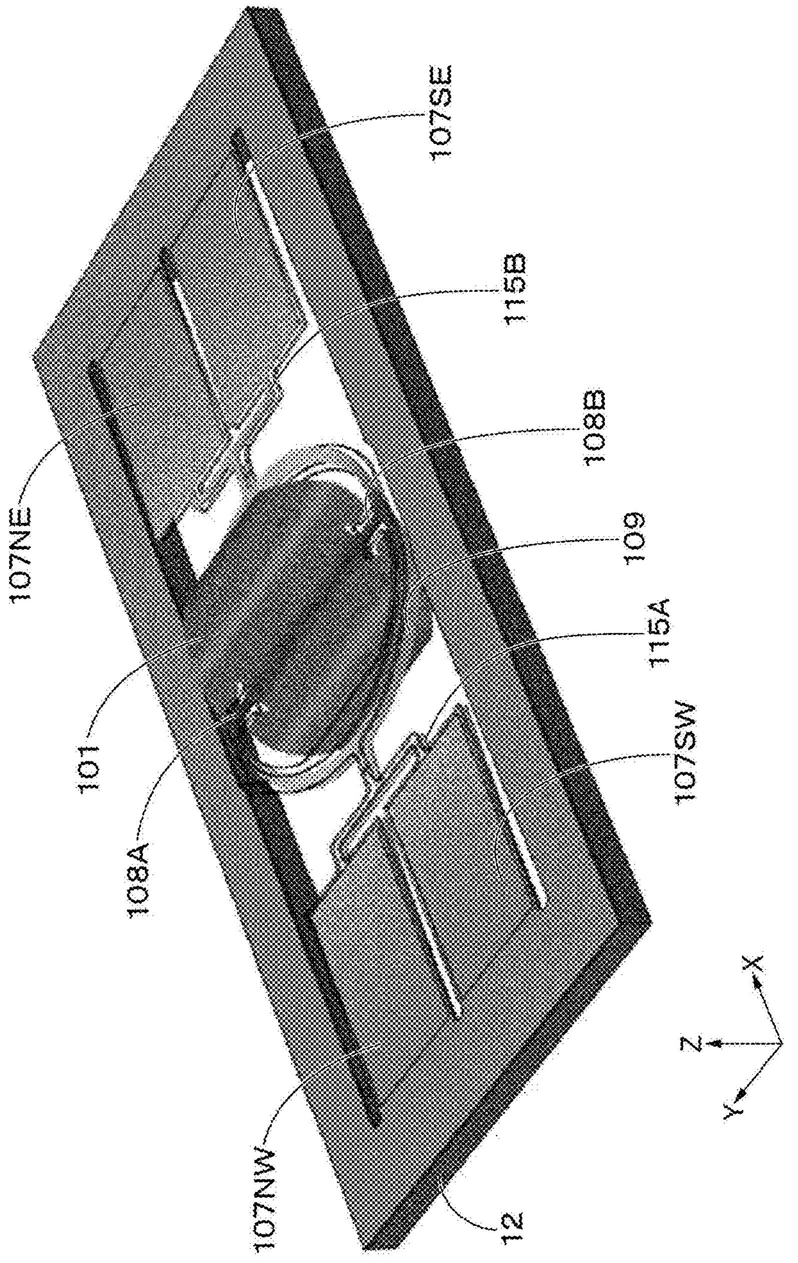
FIG. 6A is a perspective view depicting an example of a horizontal vibration of the comparative MEMS device.
Figure 6B:
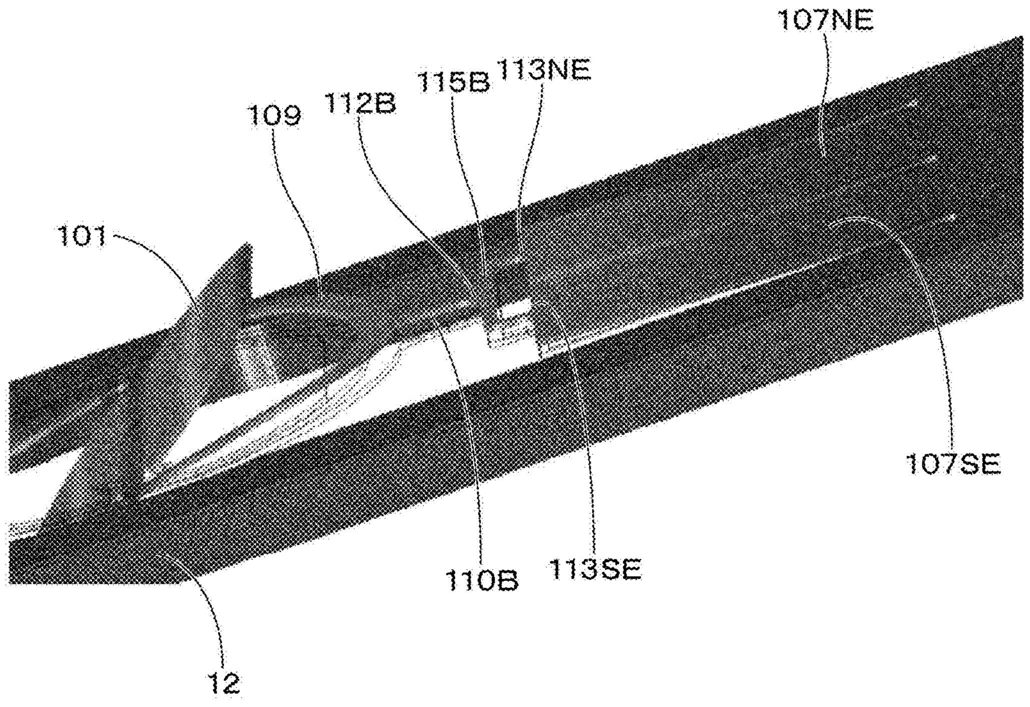
FIG. 6B is an enlarged view depicting the example of the horizontal vibration of the comparative MEMS device.
Figure 6C:
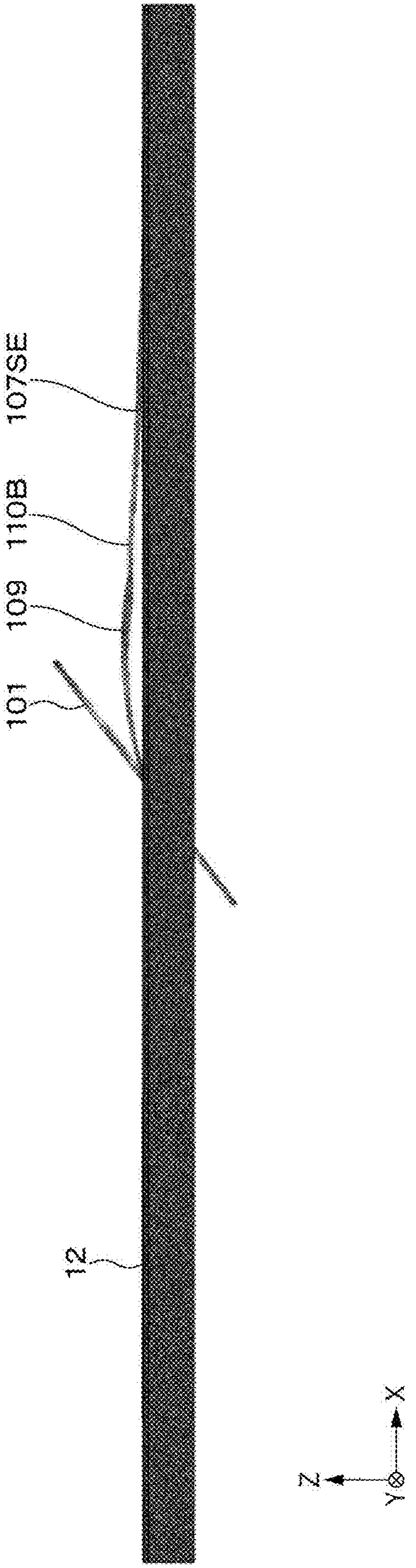
FIG. 6C is a side view depicting the example of the horizontal vibration of the comparative MEMS device.
Figure 7A:
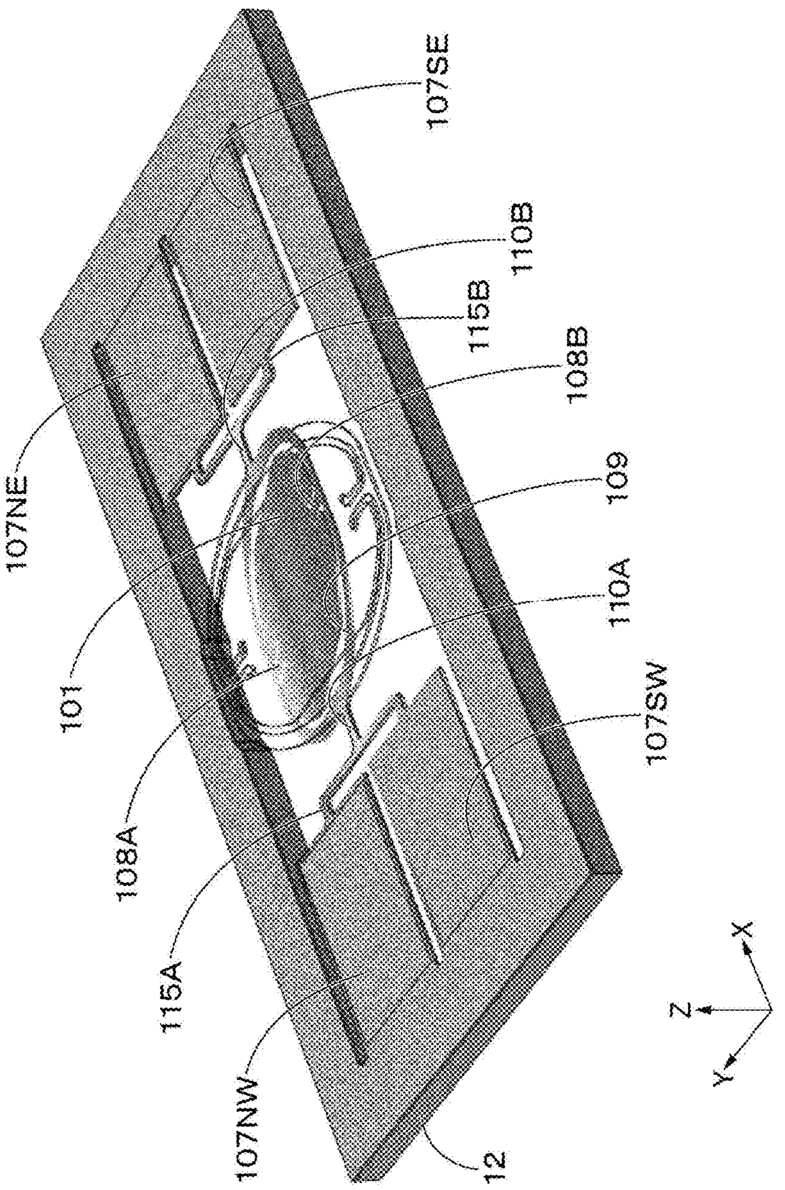
FIG. 7A is a perspective view depicting an example of a vertical vibration of the comparative MEMS device.
Figure 7B:
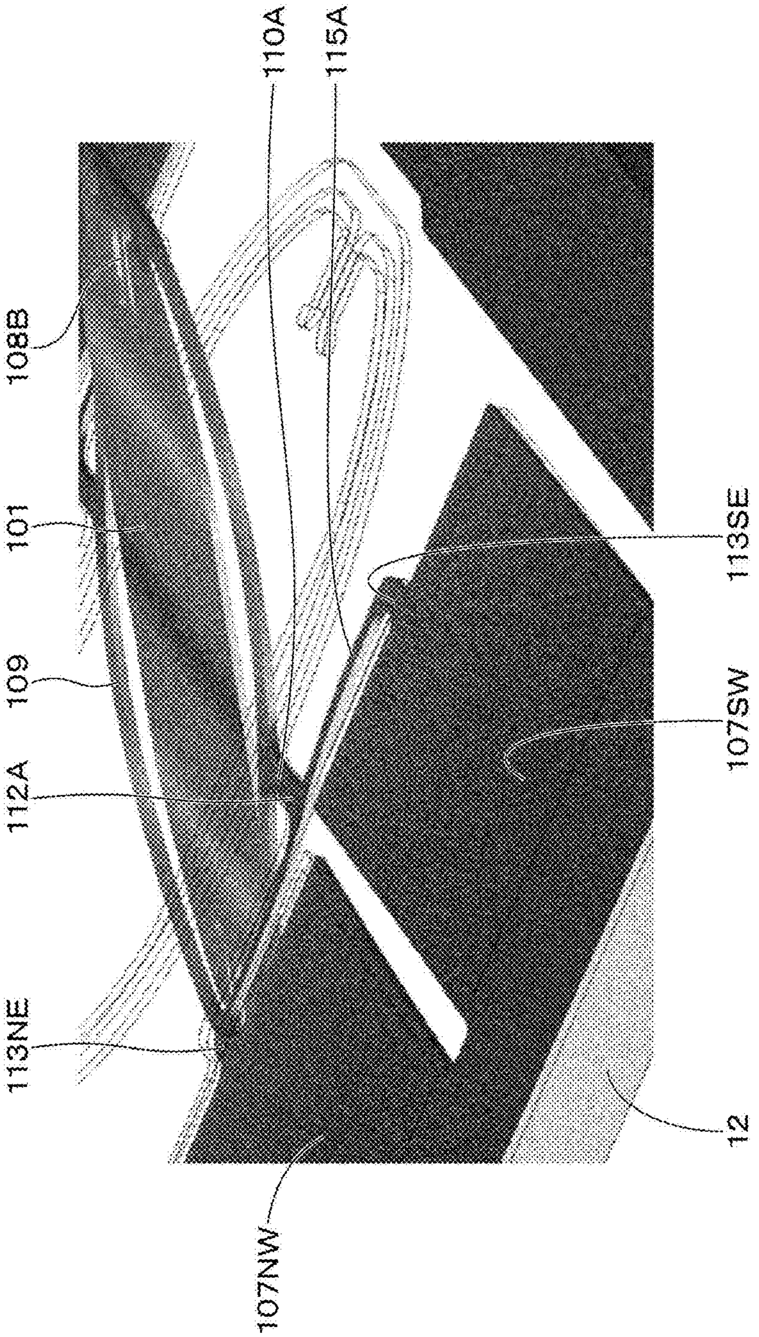
FIG. 7B is an enlarged view depicting the example of the vertical vibration of the comparative MEMS device.
Figure 7C:
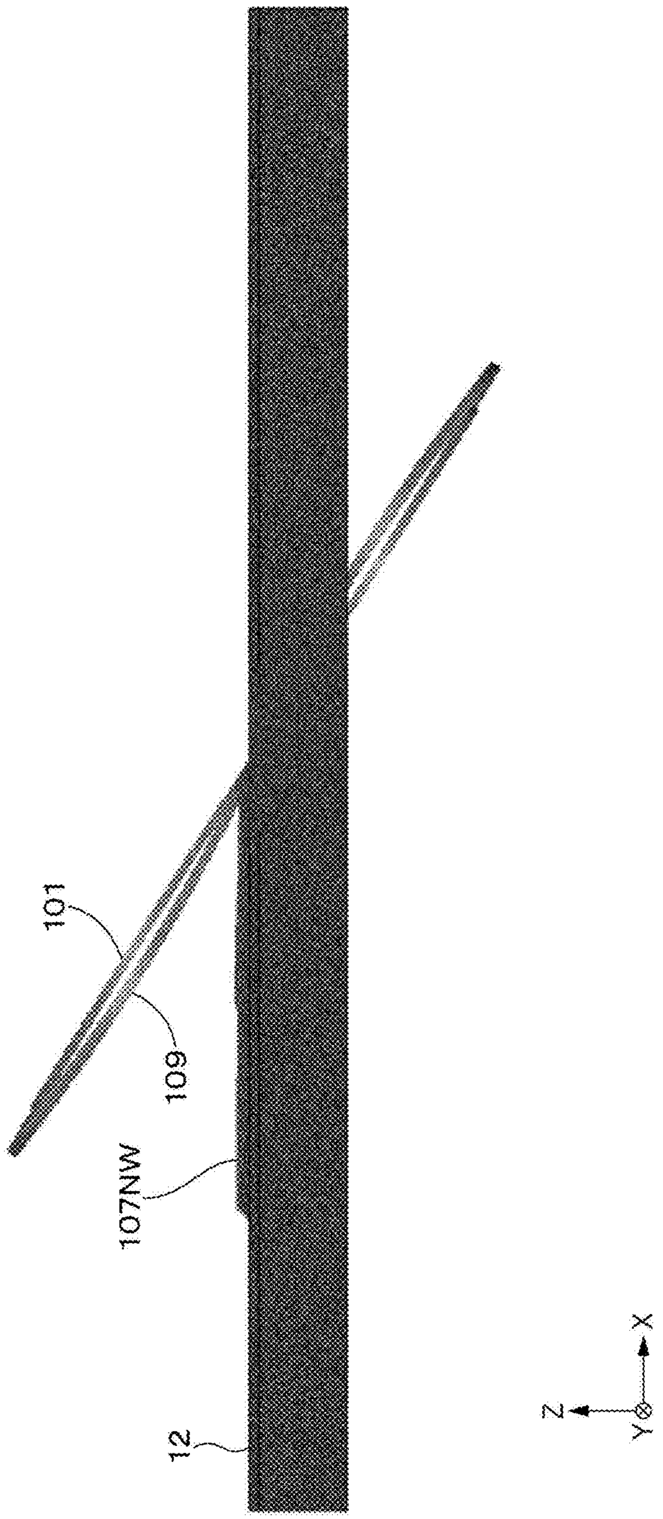
FIG. 7C is a side view depicting the example of the vertical vibration of the comparative MEMS device.

FIGS. 6A, 6B, and 6C depict how horizontal torsional vibrations occur in the MEMS device 100A. Also, FIGS. 7A, 7B, and 7C illustrate how vertical torsional vibrations of the MEMS device 100A occur. Further, Table 1 below lists horizontal and vertical deflection angles in the cases with and without the snake beams 111.

TABLE 1

| | Horizontal resonance frequency | Horizontal deflection angle | Vertical resonance frequency | Vertical deflection angle |
|---|---|---|---|---|
| With snake beams | 2360 Hz | 30 degrees | 1260 Hz | 33 degrees |
| Without snake beams | 2560 Hz | 28 degrees | 1490 Hz | 23 degrees |

As listed in Table 1, in the case where the snake beams 111 are present, the horizontal resonance frequency is 2,360 hertz, the horizontal deflection angle of the mirror 101 is 30 degrees, the vertical resonance frequency is 1,260 hertz, and the vertical deflection angle of the mirror 101 is 33 degrees. In the case of the MEMS device 100A without the snake beams 111, i.e., in the case where, for example, there is a minimum distance from the first connection part 112A to the second connection part 113NW for the actuator 107NW as connected only by a beam parallel to the horizontal rotation axis and by a beam parallel to the vertical rotation axis, the horizontal resonance frequency is 2,560 hertz, the horizontal deflection angle of the mirror 101 is 28 degrees, the vertical resonance frequency is 1,490 hertz, and the vertical deflection angle of the mirror 101 is 23 degrees. That is, the horizontal and vertical deflection angles are both larger in the configuration having the snake beams 111 than in the configuration without them.

An ordinary MEMS mirror causes the beams connected therewith to twist significantly. For this reason, the mirror is excited by actuators with small amplitudes. By contrast, the MEMS device 100 of the embodiment is characterized by large amplitudes of the actuators 107 as indicated by the simulation results in FIGS. 2A, 2B, 2C, 3A, 3B, and 3C. This causes the ring-shaped beam 109 to bend significantly. The ring-shaped beam 109 and the mirror 101 have a small angle difference therebetween, which means that the torsion of the first beams 108A and 108B is limited. The Q value of the MEMS device is as small as 40 or thereabouts. For example, the drive power of the actuators is greater for this device than for the MEMS device described in NPT 1. Meanwhile, a large deflection angle can be obtained even in the atmosphere where air damping is significant.

As described above, in the MEMS device 100 of the embodiment, the large amplitudes of the actuators 107 cause large changes in the distance from the second connection part 113NE to the second connection part 113NW and in the distance from the third connection part 113SE to the third connection part 113SW in horizontal torsional movements. As depicted in FIG. 2B, in the MEMS device 100, deformations of the snake beams 111 (specifically, displacement of the first connection part 112B from its stationary state toward the mirror 101) absorb the above-described distance changes. In the case of the MEMS device 100A, by contrast, there is little displacement of the first connection part 112B toward the mirror 101 causing the ring-shaped beam 109 to deform significantly, as depicted in FIG. 6B.

In vertical torsional movements, there are much larger changes in the distance from the second connection part 113NE to the third connection part 113SE and in the distance from the second connection part 113NW to the third connection part 113SW. As illustrated in FIG. 3B, the deformation of the snake beam 111A absorbs the length changes. Without the snake beams, the length changes cannot be absorbed, so that the amplitudes of the actuators 107 are restricted as illustrated in FIG. 7B. The deformation of the snake beam 111A in FIG. 3B reveals a large torsion near the second beam 110A but little torsion near the second connection part 113NW and near the third connection part 113SW. As a result, the deflection angle of the mirror 101 is increased.

For ordinary snake beams that repeatedly reciprocate horizontally or vertically, there is a large difference in spring constant on the horizontal or vertical rotation axis, which makes it difficult to balance the deflection angles on the two axes. Still, the deflection angles on the two axes can be balanced by a configuration that suitably combines the snake beams 111A and 111B, one beam extending in the horizontal rotation axis direction and the other beam extending in the vertical rotation axis direction. Preferably, the portions of the snake beams 111A and 111B extending from the second beams 110A and 110B are folded in parallel with the ring-shaped beam 109, and folded perpendicular to the second beams 110A and 110B on the side of the actuators 107. This enlarges the vertical deflection angle. Further, as depicted in FIGS. 1, 2A, 2B, 2C, 3A, 3B, and 3C, the region dominated by the beam extending in the Y-axis direction may be located outside, and the region dominated by the beam extending in the X-axis direction may be located inside.

In the MEMS device 100 configured as described above, the amplitudes of the actuators 107 are larger in resonant operation than in non-resonant operation. That is, the snake beams 111 connected between the mirror 101 and the actuators 107 are inside a resonant structure, the mirror 101 and the snake beams 111 being structured to resonate integrally. This is the difference from the case in which ordinary bellows-shaped beams are used for linear drive, which is a non-resonant operation, or for connection with the frame (for simple positioning or electrical wiring purposes).

In the MEMS device configured as described above, the amplitudes of the actuators 107 are larger in resonant operation on the two axes than in non-resonant operation. That is, the snake beams 111 connected between the mirror 101 and the actuators 107 are inside a two-axis resonant structure, with the mirror 101 and the snake beams 111 structured to resonate integrally. This is the difference from the case in which ordinary bellows-shaped beams are used for linear drive, which is a non-resonant operation, or for connection with the frame (for simple positioning or electrical wiring purposes).

As described above, the MEMS device 100 of the embodiment can increase the optical deflection angle and thus enlarge the range of distance measurement. Further, a stable operation of the MEMS device 100 contributes to increasing the accuracy of distance measurement.

[Schematic Configuration of the Distance Measuring Apparatus to which the MEMS Device can be Applied]

Figure 8:
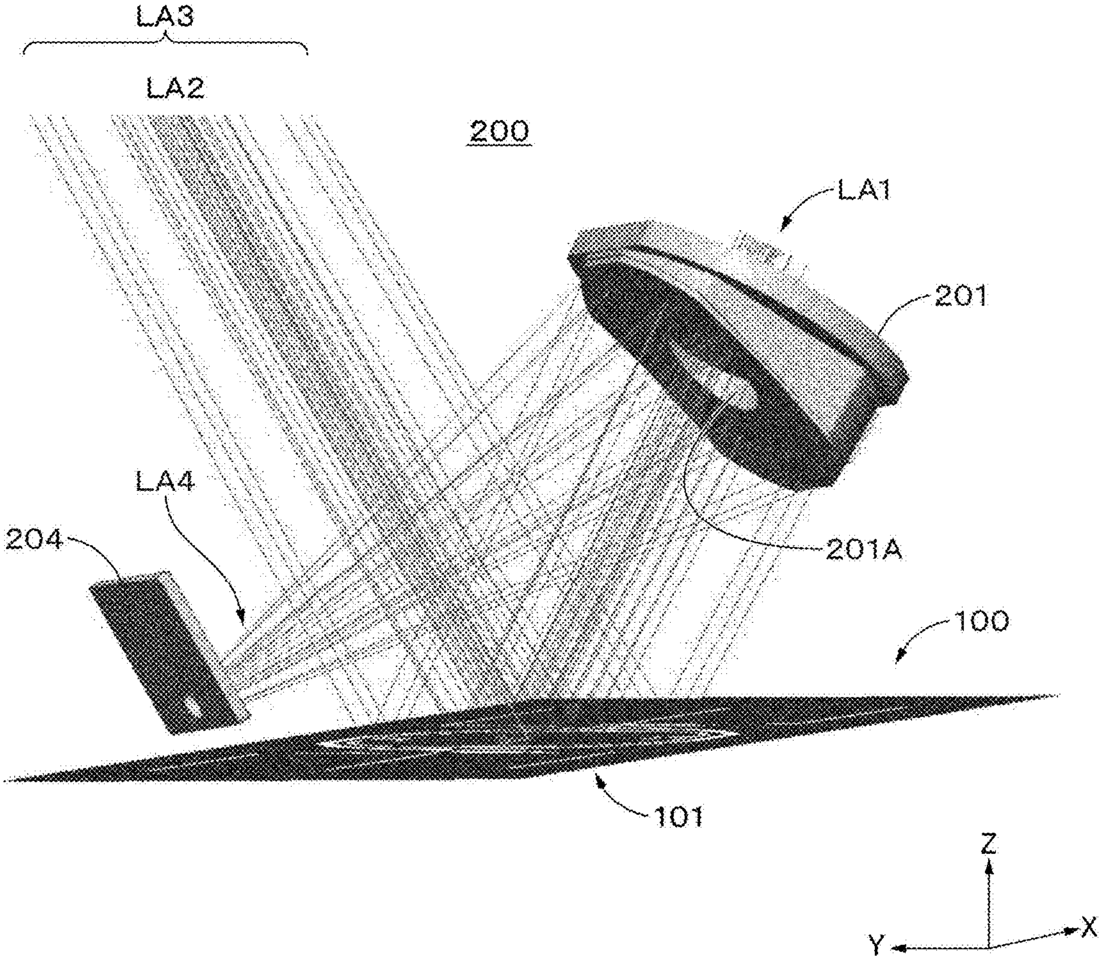
FIG. 8 is a perspective view depicting a schematic configuration of a distance measuring apparatus to which the MEMS device of the embodiment can be applied.

A schematic configuration of a distance measuring apparatus (distance measuring apparatus 200) to which the MEMS device 100 can be applied is explained below with reference to FIG. 8. An incident laser beam LA1 emitted from a light source, not depicted, passes through an opening 201A of a holed parabolic mirror 201 to become an emission laser beam LA2 that is reflected by a central part of the mirror 101. Scattered light LA3 from an object (distance measuring target) is reflected by the entire surface of the mirror 101. The reflected light is focused by the holed parabolic mirror 201, which is an exemplary light focusing part. The focused light LA4 passes through an aperture 204. Past the aperture 204, the light is received by a light receiving element (not depicted) such as a silicon photomultiplier for conversion to an electrical signal. The light reflected by the central part of the mirror 101 passes through the opening 201A of the holed parabolic mirror 201. It is to be noted that it is alternatively possible to furnish the opened portion of the holed parabolic mirror 201 not with the opening 201A but with a polarization-dependent film as part of the parabolic surface, the incident laser beam LA1 being allowed to pass through the polarization-dependent film, and scattered light from the object being reflected by the mirror 101, substantially a half of which is focused. As another alternative, the opened portion of the holed parabolic mirror 201 may be furnished not with the opening 201A but with a low-reflection film either as part of the parabolic surface or as a plane, the incident laser beam LA1 being allowed to pass therethrough. As a further alternative, the holed parabolic mirror 201 may be partially formed into an elliptical surface to constitute a multifocal mirror. This improves the accuracy of distance measurement when the object (distance measuring target) is far away as well as nearby. The holed parabolic mirror 201 may also be a multifocal mirror having a free-form curved surface interpolating a part of the mirror smoothly into an elliptical surface. This also improves the accuracy of distance measurement when the object (distance measuring target) is not only far away but also nearby.

The aperture 204 raises the ratio of the scattered light LA3 coming from the object to external light. That is, the aperture 204 is a basic optical part that raises the S/N (Signal Noise Ratio) and causes the reception angle of the aperture 204 relative to the holed parabolic mirror 201 to become larger than the divergence angle of the emission laser beam LA2. It is to be noted that, in the case where a plurality of light receiving elements and a plurality of apertures are in use, the reception angle of each aperture is reduced by the number of the elements. Consequently, given a laser emission pattern forming a Gaussian beam that is unimodal on two axes perpendicular to each other, the divergence angle of the emission laser beam LA2 becomes minimal for the same beam waist. The appropriate aperture size is also reduced. If the beam waist (radius at intensity of $1/e^2$) of the laser beam emitted to the mirror 101 is 0.8 mm, the divergence angle (half angle) $\theta_1$ of the emission laser beam with a wavelength of 830 nm is 0.33 mrad. If the focal point distance of the holed parabolic mirror 201 is 12 mm, the minimum size of an ideal aperture 204 is 4.0 μm in radius. In practice, the surface accuracy of the mirror 101 and that of the holed parabolic mirror 201 of the MEMS device 100 may be taken into consideration to optimize the radius of the aperture 204 within a range of up to 15.0 μm.

A diffusion material may be interposed between the aperture 204 and the light receiving surface in order to even out the scattered light on the light receiving surface past the aperture 204. In particular, in the case where the light receiving element is a silicon photomultiplier, the diffusion material improves the accuracy of distance measurement by evening out the expected numbers of photons entering each cell.

The frame 12 of the MEMS device 100 is fixed to a sturdy chassis. The chassis has a dent to avoid contact with the mirror 101 and is closed under the frame 12. For example, the chassis includes metal such as stainless steel, a semiconductor such as silicon, glass, or a glass epoxy substrate. The dent of the chassis should preferably be a flat structure deep enough to avoid contact with the mirror. Sound emanating from the back side due to a mirror vibration and reflected forward by the flat portion can be interfered with by sound coming from the front side due to a mirror vibration and thus be diminished. In the case where the chassis has an open structure, the sound level measured in front of the mirror is increased by approximately 5 dB.

[Specific Configuration Example of the Distance Measuring System]

Figure 9:
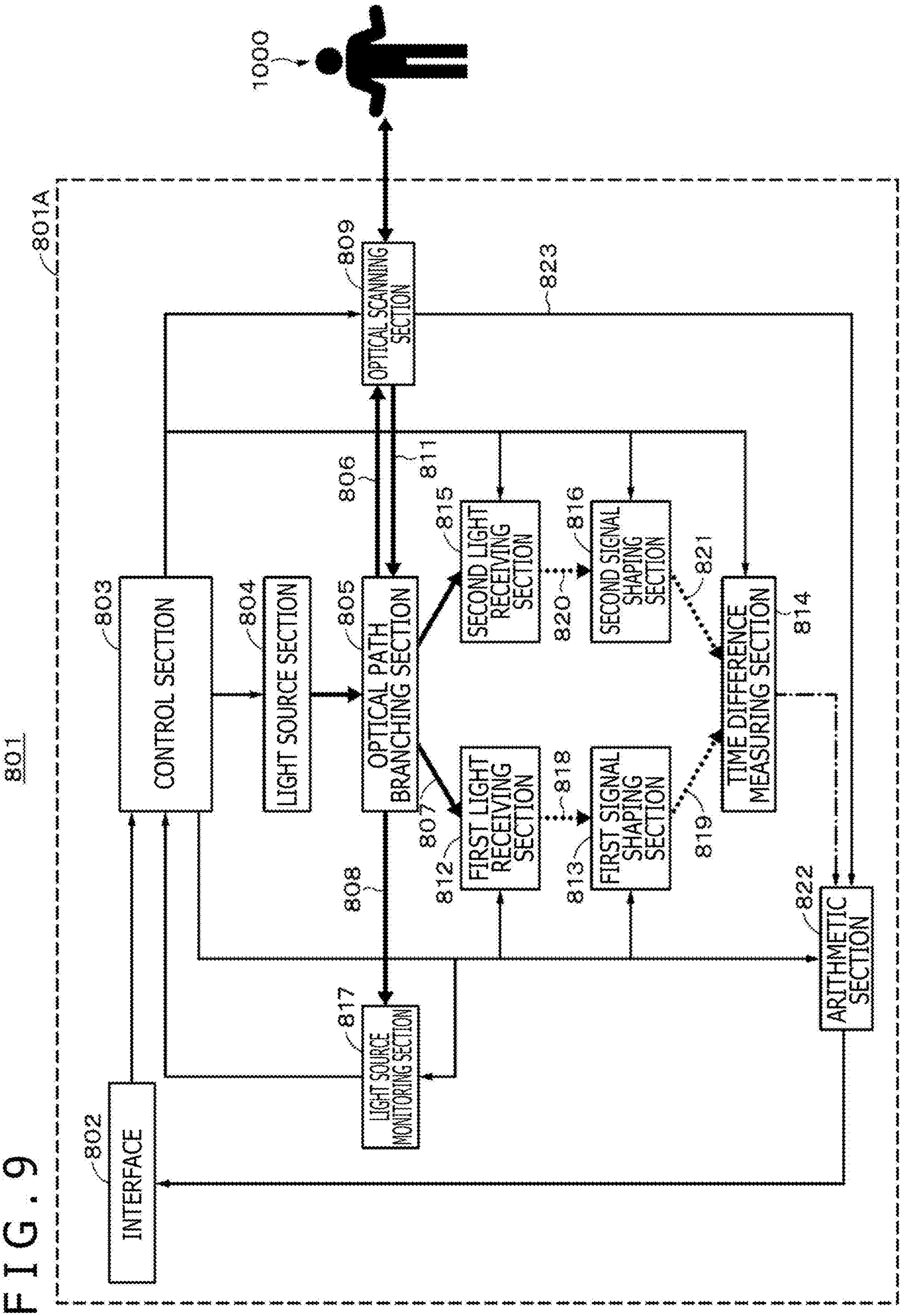
FIG. 9 is a view depicting a specific configuration example of a distance measuring system to which the MEMS device of the embodiment is applied.

FIG. 9 is a view depicting a specific configuration example of a distance measuring system to which the above-described MEMS device 100 is applied. In FIG. 9, solid-line arrows stand for control signals, thick-line arrows for optical paths, broken-line arrows for signal lines, and dashed-line arrows for data lines. A distance measuring system 801 includes a distance measuring apparatus 801A and a distance measuring target 1000. The distance measuring apparatus 801A includes an interface 802, a control section 803, a light source section 804, an optical path branching section 805, an optical scanning section 809 to which the MEMS device 100 can be applied, a first light receiving section 812, a first signal shaping section 813, a time difference measuring section 814, a second light receiving section 815, a second signal shaping section 816, a light source monitoring section 817, and an arithmetic section 822.

The interface 802 permits exchanges of data and commands between the distance measuring apparatus 801A and an external device. The control section 803 provides overall control of the distance measuring apparatus 801A. The control section 803 controls the operations of the components of the distance measuring apparatus 801A.

Upon receipt of control parameters from the outside via the interface 802, the control section 803 sends control signals to a plurality of devices and circuits, to be discussed later. The light source section 804 includes a Q switch semiconductor light-emitting element and a driving circuit. The light source section 804 emits a pulse beam of a high beam quality, with the pulse width on the order of sub-nanoseconds, preferably 20 picoseconds or less, and with the pulse energy of between several hundred picojoules and several nanojoules.

The optical path branching section 805 causes the light from the light source section 804 to branch into measurement light 806 to be emitted to the distance measuring target 1000 typically via a beam splitter, into reference light 807 for obtaining a start signal for time measurement, and into control light 808 for controlling the light source. The measurement light 806 is sent to the optical scanning section 809 for sequential emission to the range of a designed FOV (Field of View). The measurement light 806 emitted to the distance measuring target 1000 such as a person is scattered. Part of the scattered light passes through the optical scanning section 809 to become detection light 811.

The reference light 807 is sent to the first light receiving section 812 for conversion to a reference electrical signal 818 by the light receiving element such as a photodiode, an avalanche photodiode, or an SiPM. The reference electrical signal 818 is sent to the time difference measuring section 814 via the first signal shaping section 813. The detection light 811 is sent to the second light receiving section 815 for conversion to a detection electrical signal 820 by the light receiving element such as an SiPM. The detection electrical signal 820 is sent to the time difference measuring section 814 via the second signal shaping section 816. The second signal shaping section 816 amplifies a very feeble detection electrical signal 820 obtained through single-photon detection, at high S/N ratio with low jitter, as will be discussed later.

The first signal shaping section 813 amplifies the reference electrical signal 818, which is output from the light receiving element and has an analog waveform, to generate a reference rectangular wave 819 based on a detection threshold value set as desired. The second signal shaping section 816 amplifies the detection electrical signal 820, which is output from the light receiving element and has an analog waveform, to generate a detection rectangular wave 821 based on a detection threshold value set as desired. The control light 808 is sent to the light source monitoring section 817 for measurement of the pulse energy and the pulse width, the measurement information being returned to the control section 803. There may be one or a plurality of rectangular waves to be sent to the time difference measuring section 814. These rectangular waves, obtained on the basis of two or more detection threshold values, may be different from one another. The time difference measuring section 814 measures a relative time of the input rectangular waves by using a TDC. The relative time may be a time difference between the reference rectangular wave 819 and the detection rectangular wave 821, a time difference between a separately provided clock and the reference rectangular wave, or a time difference between the clock and the detection rectangular wave. The relative time is varied depending on the type of the TDC. The TDC uses, for example, the counter method alone, a method of combining the counter method with an inverter-based ring-delay line to make a plurality of measurements for mean value calculation, or a method of combining the counter method with a high-precision measurement method of picosecond resolution such as vernier buffering or pulse shrink buffering. The time difference measuring section 814 may be given functions to measure a rise time, a peak value, and a pulse integrated value of the detection electrical signal 820 output from the second light receiving section 815. These measurements can be made by use of the TDC or an ADC (Analog to Digital Converter).

The time difference measured by the time difference measuring section 814 is sent to the arithmetic section 822. The arithmetic section 822 performs offset adjustment, or uses the rise time, peak value, or pulse integrated value of the detection electrical signal 820 for Time-walk error correction or for temperature correction. The arithmetic section 822 also performs vector operations using scanning timing information 823 sent from the optical scanning section 809. It is to be noted that the interface 802 may alternatively output distance data and scanning angle data without execution of vector operations. Further, on these pieces of data, suitable processes may be performed such as noise removal, averaging with adjacent points, and interpolation. Advanced algorithms such as recognition processing may also be carried out.

<Variants>

Whereas one preferred embodiment of the present disclosure has been described above in specific terms, the above embodiment is not limitative of the present disclosure. Many variants may be made of the embodiment on the basis of the technical idea of the present disclosure. Some of the variants are explained below.

[First Variant]

Figure 10:
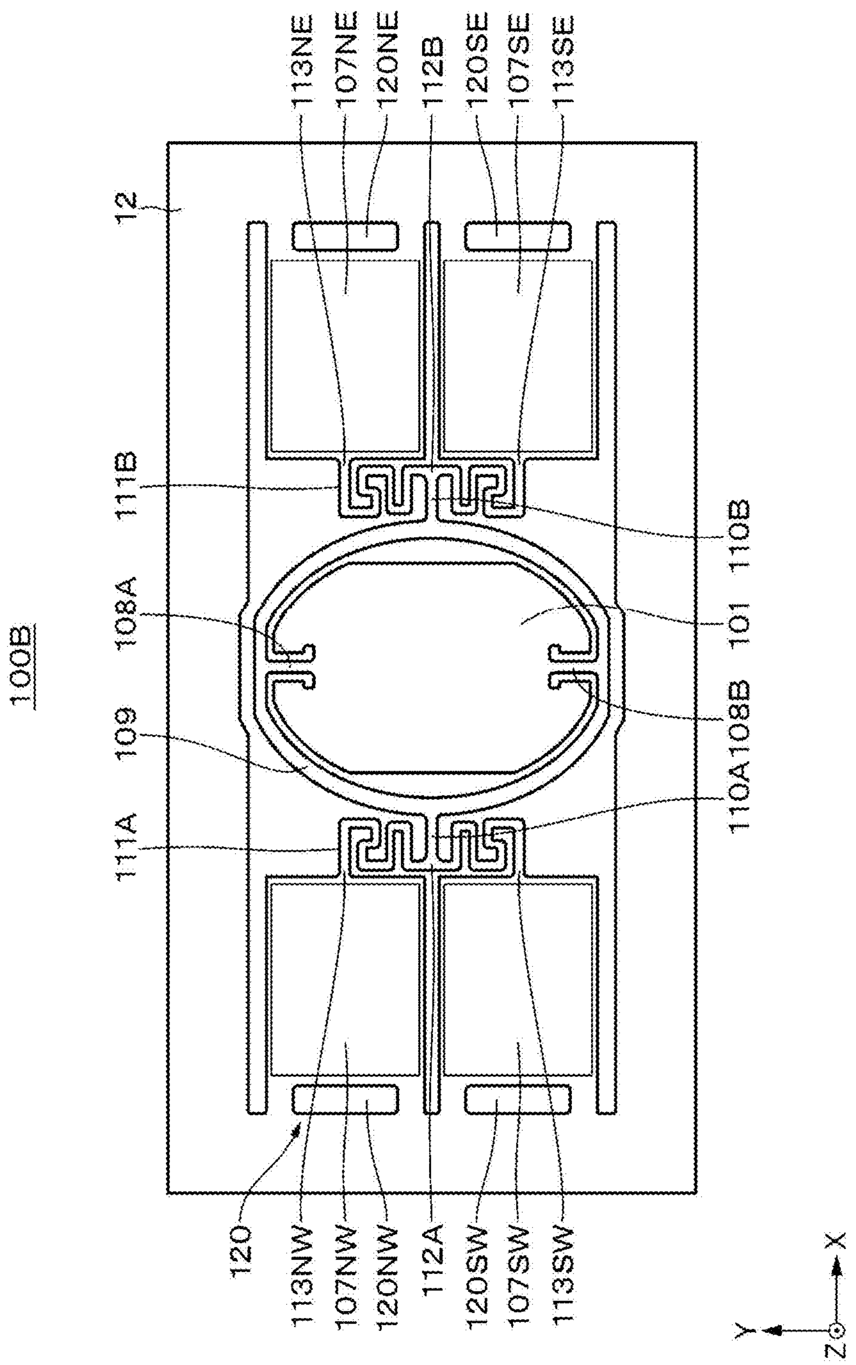
FIG. 10 is a view for explaining a MEMS device as a first variant.

FIG. 10 depicts a configuration example of a MEMS device (MEMS device 100B) as a first variant. What makes the MEMS device 100B different from the MEMS device 100 is that slits 120 are provided in the connection parts between the actuators 107 and the frame 12. For example, slits 120NW, 120SW, 120NE, and 120SE are interposed respectively between the actuators 107NW, 107SW, 107NE, and 107SE on one hand and the frame 12 on the other hand. The slits 120 are each a rectangular hole, for example, but may each be formed as a circular hole or a hole of some other shape. The slits 120 reduce (soften) the stiffness of the connection parts between the actuators 107 and the frame 12. It is to be noted that, in the MEMS device 100B, the path length L is 2.5×L0, which is the same as in the above embodiment, and the number of bends N is 10.

Figure 11A:
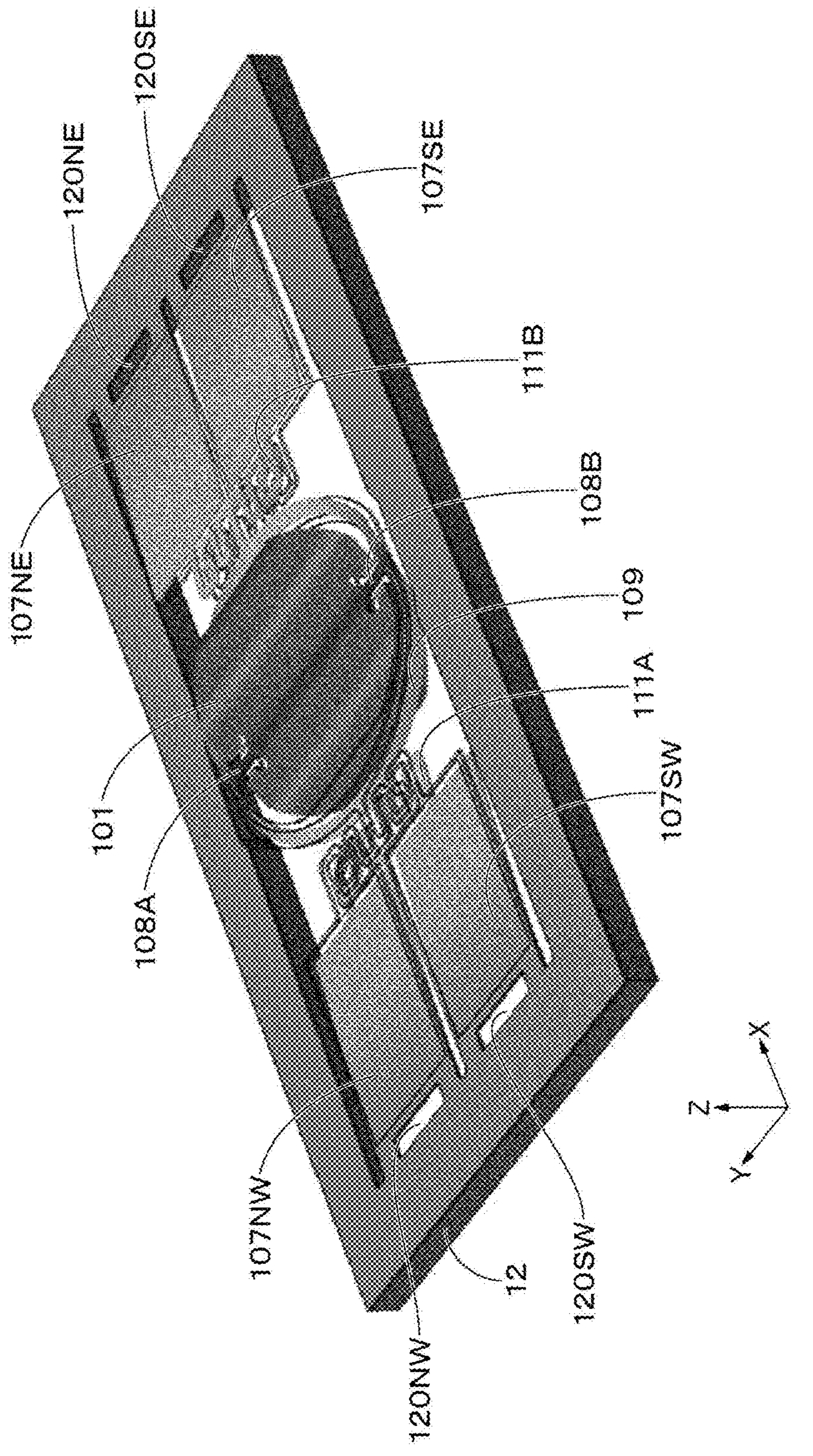
FIG. 11A is a perspective view depicting an example of a horizontal vibration of the MEMS device of the first variant.
Figure 11B:
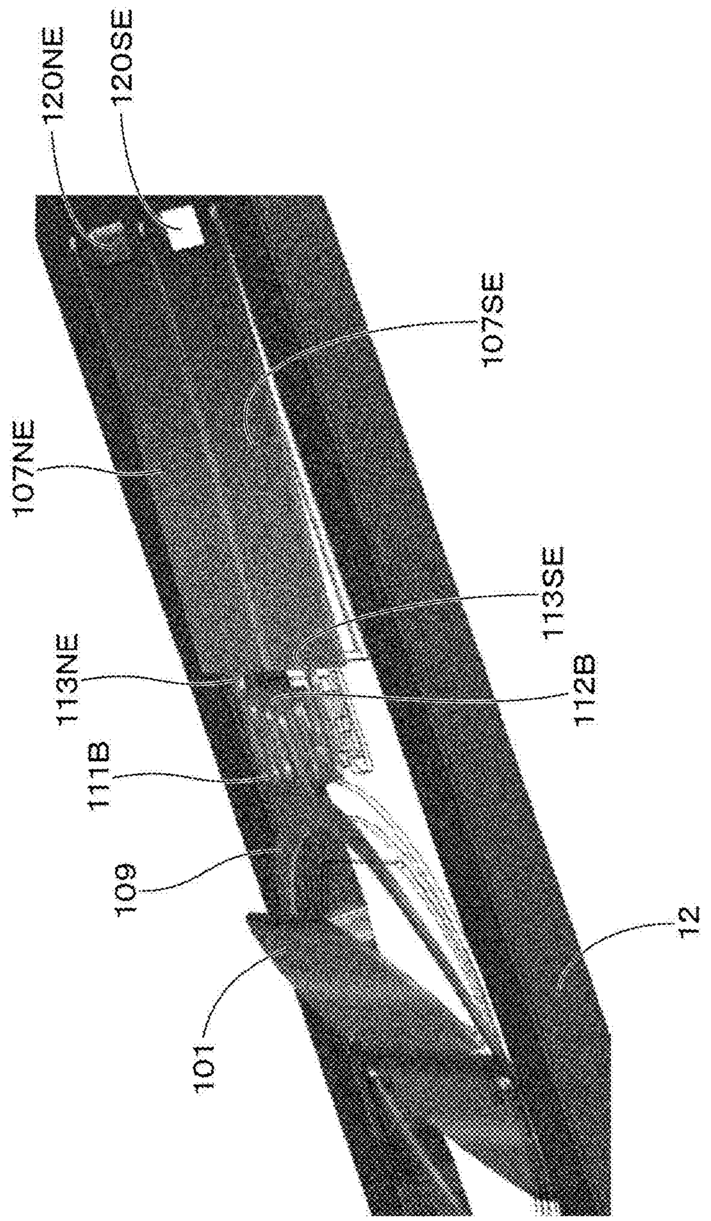
FIG. 11B is an enlarged view depicting the example of the horizontal vibration of the MEMS device of the first variant.
Figure 11C:
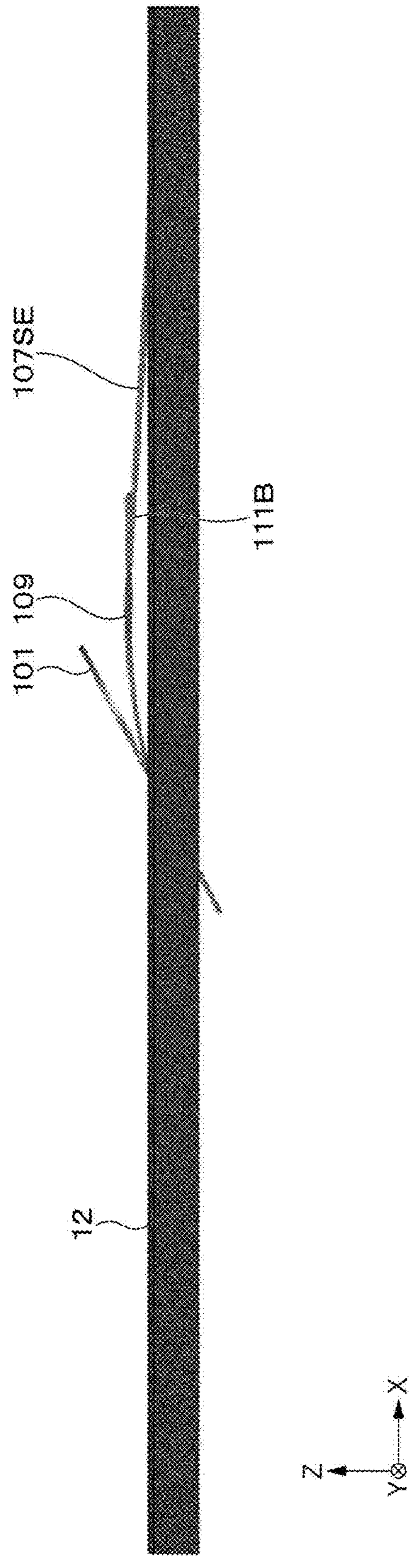
FIG. 11C is a side view depicting the example of the horizontal vibration of the MEMS device of the first variant.

The operation of the MEMS device 100B is schematically explained here. When the actuators 107NE and 107SE are driven in a phase and the actuators 107NW and 107SW are driven in a phase opposite to the phase of a drive signal for driving the actuators 107NE and 107SE, horizontal torsional vibrations occur around the horizontal rotation axis. FIGS. 11A, 11B, and 11C illustrate how horizontal torsional vibrations take place.

Figure 12A:
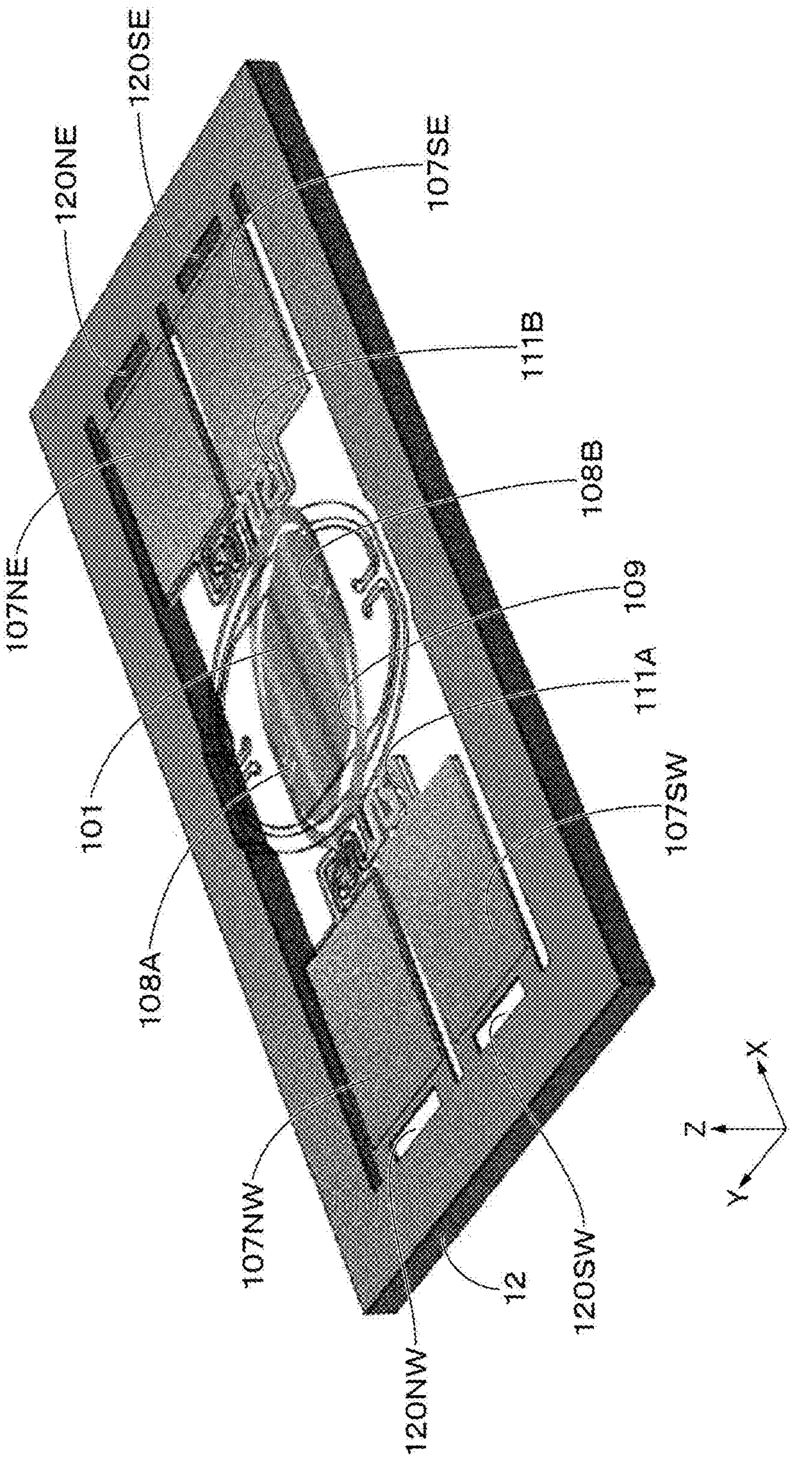
FIG. 12A is a perspective view depicting an example of a vertical vibration of the MEMS device of the first variant.
Figure 12B:
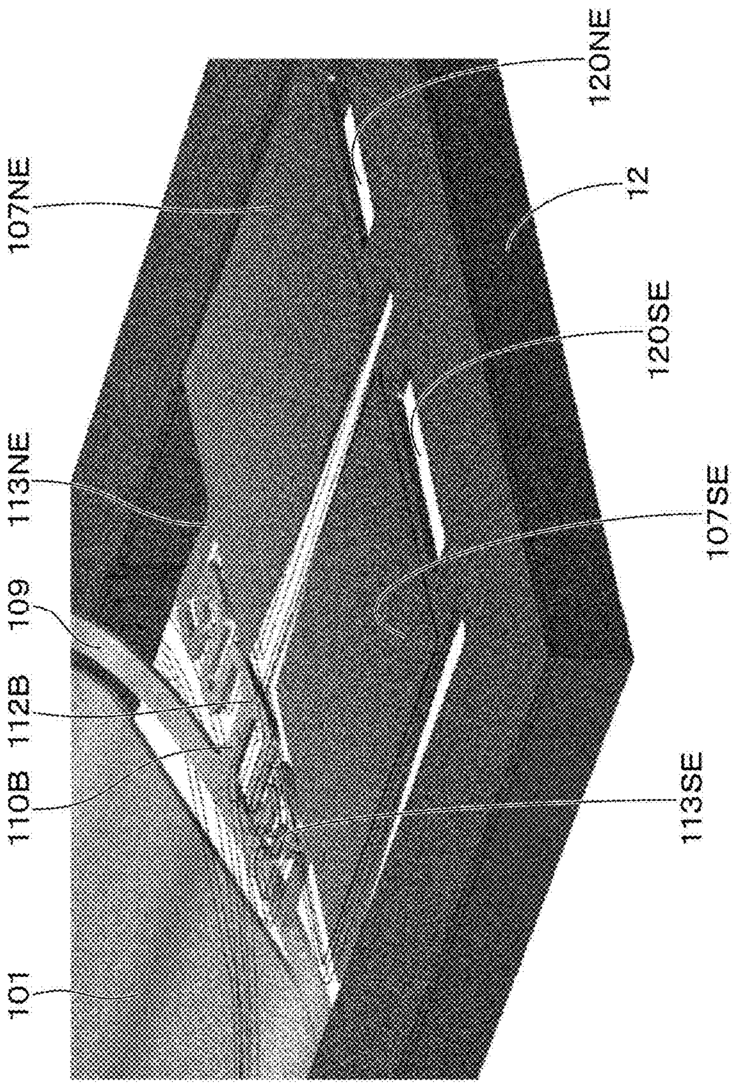
FIG. 12B is an enlarged view depicting the example of the vertical vibration of the MEMS device of the first variant.
Figure 12C:
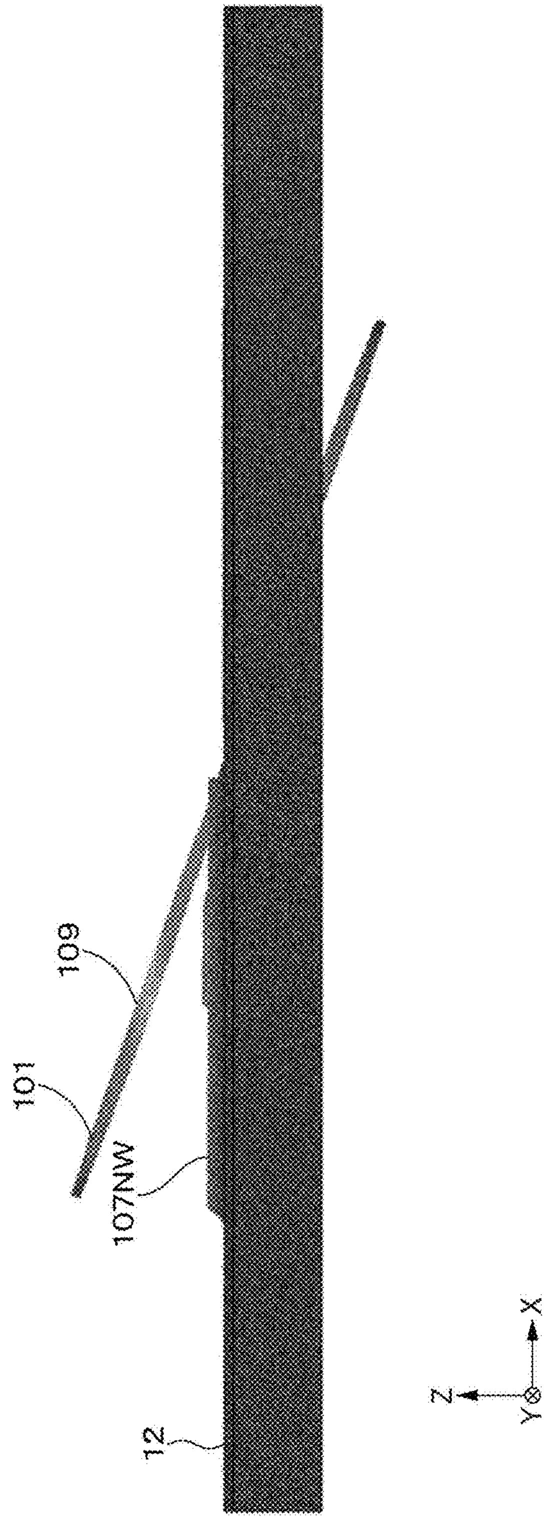
FIG. 12C is a side view depicting the example of the vertical vibration of the MEMS device of the first variant.

Also, when the actuators 107NE and 107NW are driven in a phase and the actuators 107SE and 107SW are driven in a phase opposite to the phase of a drive signal for driving the actuators 107NE and 107NW, vertical torsional vibrations occur around the vertical rotation axis. FIGS. 12A, 12B, and 12C illustrate how vertical torsional vibrations take place. Combining the horizontal torsional vibrations with the vertical torsional vibrations allows the mirror 101 to vibrate two-dimensionally in a desired direction.

The MEMS device, provided with the slits 120, has larger amplitudes of the actuators 107 and thus causes the ring-shaped beam 109 to bend more significantly than the MEMS device without the slits 120. Given a smaller angular difference between the ring-shaped beam 109 and the mirror 101, the torsion of the first beams 108 is reduced.

Comparing the levels of noise from mirror operation under the same conditions with or without the slits 120 (i.e., between the MEMS devices 100B and 100) reveals a reduction of noise level by approximately 5 dB in the MEMS device 100B with the slits 120. The drop of noise level is considered attributable to reduced vibrations propagating from the frame 12 to the chassis fixing the frame 12. The structure of this variant provided with the slits 120 is effective in the case where the strength of the frame 12 and that of the chassis are low. Therefore, whether or not to provide the slits 120 should preferably be determined in consideration of not the MEMS device alone but the entire system including the chassis. Meanwhile, providing the above-described snake beams 111 proves to be beneficial with or without the slits 120.

[Second Variant]

Figure 13:
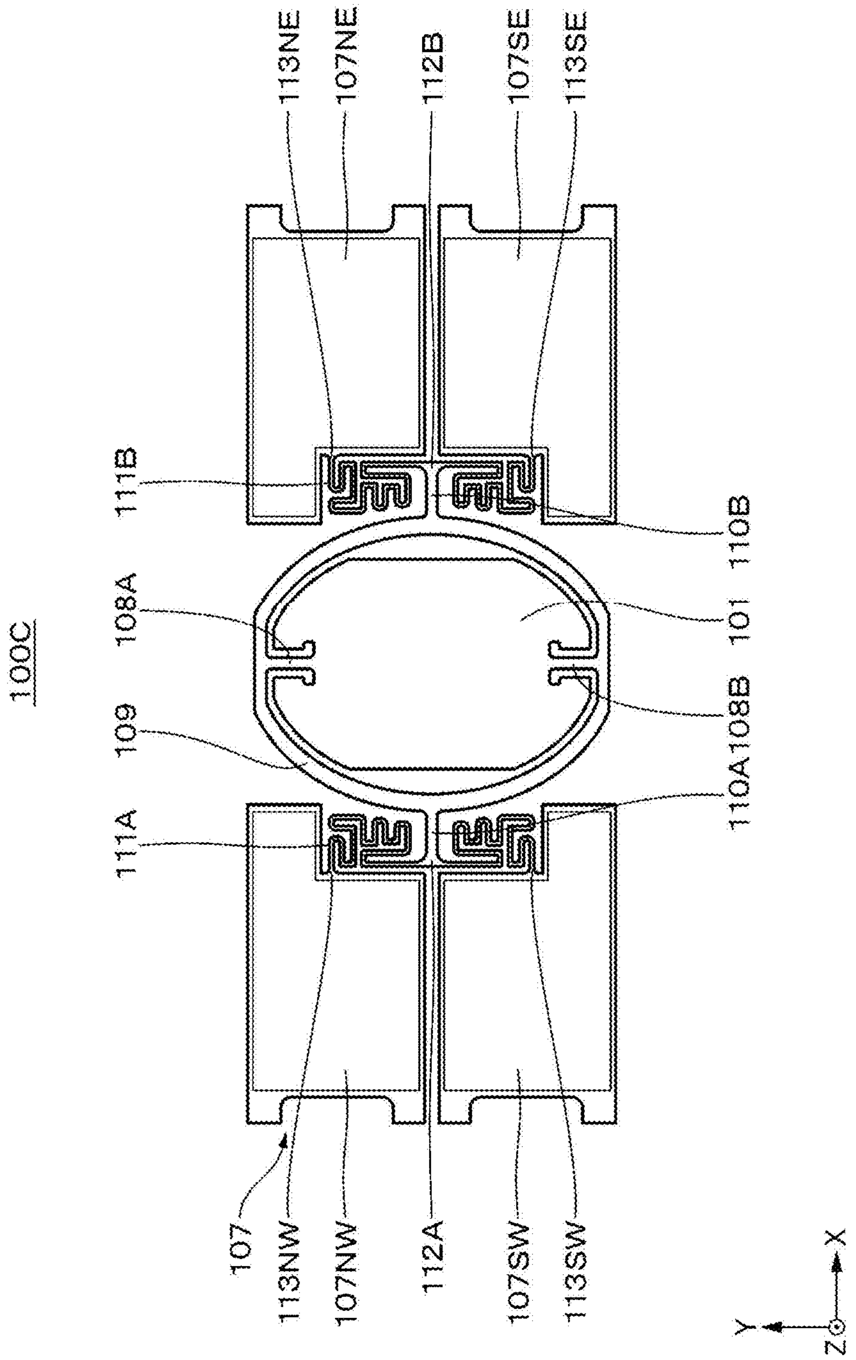
FIG. 13 is a view for explaining a MEMS device as a second variant.

FIG. 13 depicts a configuration example of a MEMS device (MEMS device 100C) as a second variant. It is to be noted that, for the purpose of simplification, the frame 12 is not depicted (this similarly applies to FIGS. 14 and 15, to be discussed later). What makes the MEMS device 100C different from the first variant is that the actuators 107 are larger, the snake beams 111A and 111B are slightly thinner, and the snake beams 111A and 111B are more complicated in shape than those in the first variant. In the case of the MEMS device 100C as the second variant, the path length L of each of the snake beams 111A and 111B is 4.2 L0, and the number of bends N is 20.

[Third Variant]

Figure 14:
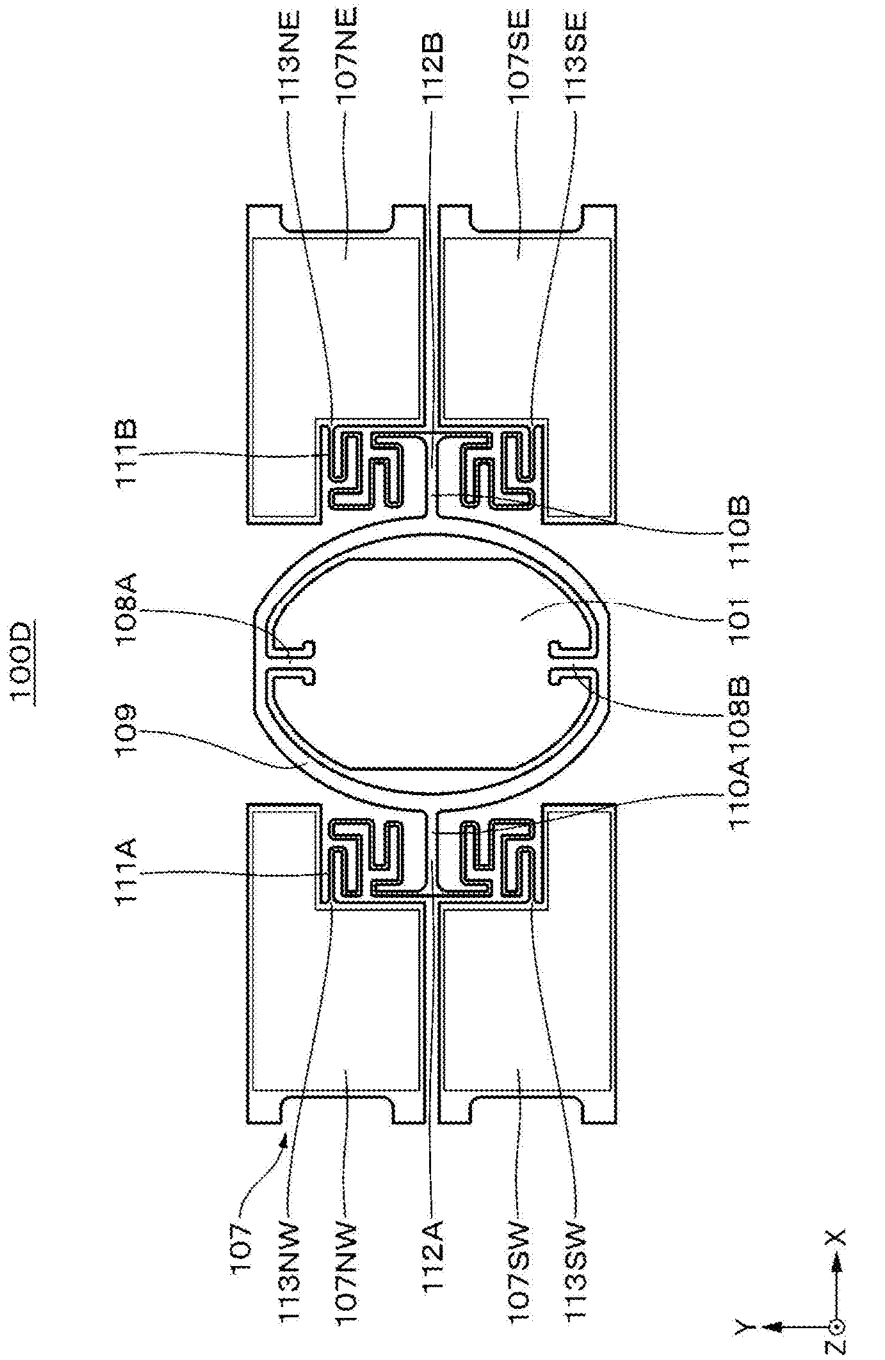
FIG. 14 is a view for explaining a MEMS device as a third variant.

FIG. 14 depicts a configuration example of a MEMS device (MEMS device 100D) as a third variant. What makes the MEMS device 100D different from the first variant is that the actuators 107 are larger in size, the second connection parts 113NW and 113NE and the third connection parts 113SW and 113SE are farther from the mirror 101, the first beams 108A and 108B are slightly longer, and the snake beams 111A and 111B are more complicated in shape than those in the first variant. In the MEMS device 100D, the path length L of each of the snake beams 111A and 111B is 4.9 L0, and the number of bends N of the MEMS device 100C is 16.

[Fourth Variant]

Figure 15:
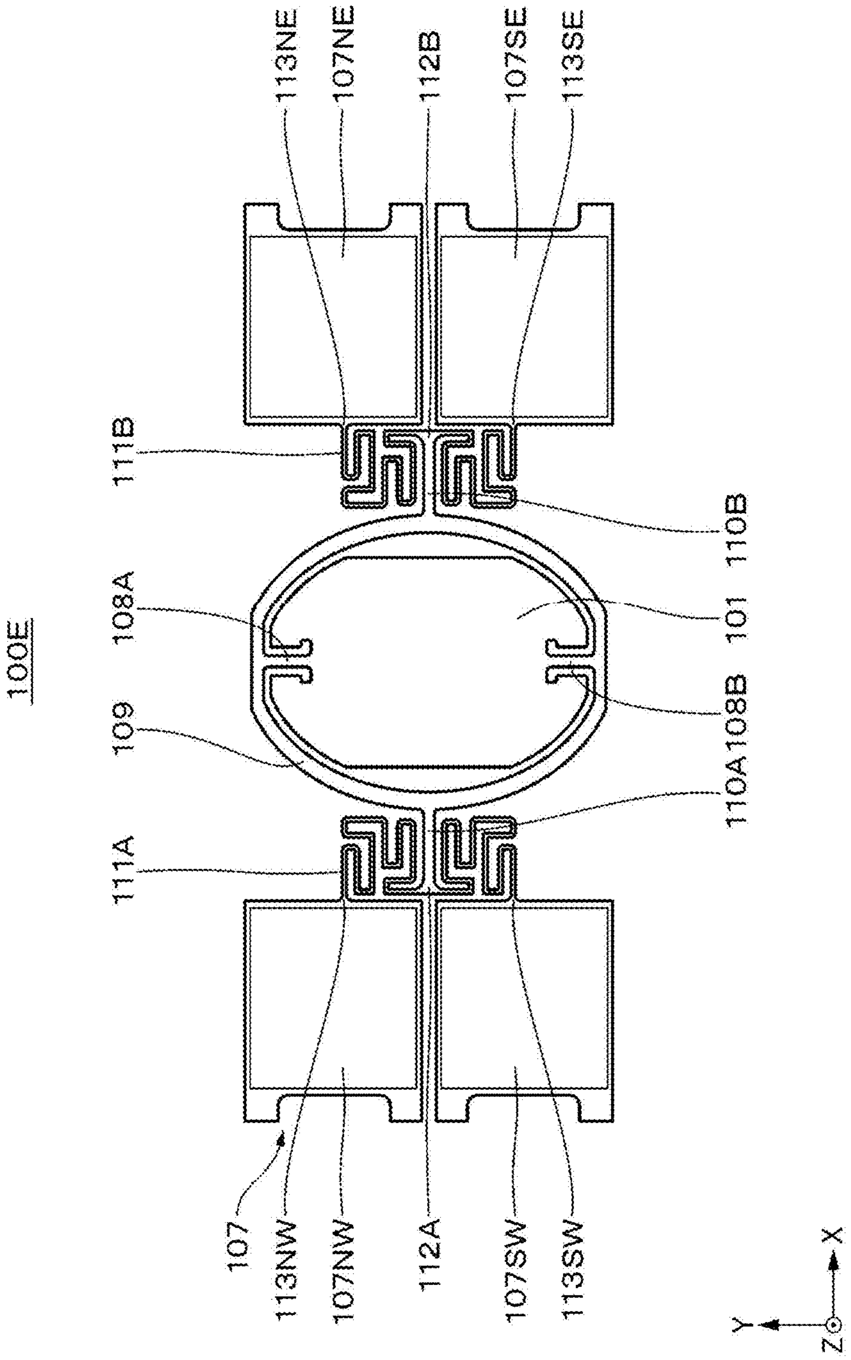
FIG. 15 is a view for explaining a MEMS device as a fourth variant.

FIG. 15 depicts a configuration example of a MEMS device (MEMS device 100E) as a fourth variant. What makes the MEMS device 100E different from the first variant is that the actuators 107 are smaller in size, the second connection parts 113NW and 113NE and the third connection parts 113SW and 113SE are farther from the mirror 101, and the snake beams 111A and 111B are more complicated in shape than in the first variant. In the MEMS device 100E, the path length L of each of the snake beams 111A and 111B is 4.5 L0, and the number of bends N is 16.

Figure 16:
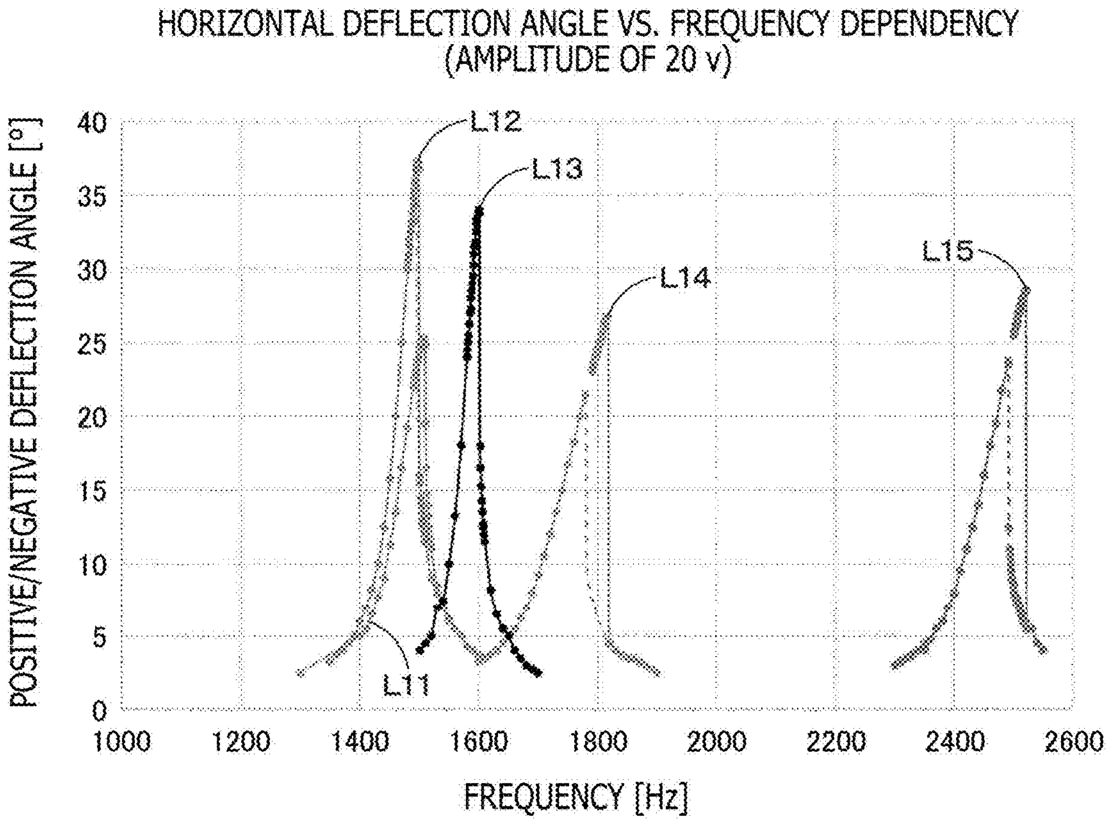
FIG. 16 is a graphic representation depicting a horizontal vibration frequency versus optical deflection angle dependency regarding each of the MEMS devices of the variants.

FIG. 16 depicts resonance characteristics of horizontal torsional vibrations of each of the MEMS devices as the first through fourth variants. Solid lines stand for the case where the frequency is gradually increased from the low frequency side, and broken lines represent the case where the frequency is gradually lowered from the high frequency side. In the graph of FIG. 16, a line L11 corresponds to the resonance characteristic of the horizontal torsional vibrations of the MEMS device 100C as the second variant (L=4.2×L0), and a line L12 corresponds to the resonance characteristic of the horizontal torsional vibrations of the MEMS device 100D as the third variant (L=4.9×L0). Also, in the graph of FIG. 16, a line L13 corresponds to the resonance characteristic of the horizontal torsional vibrations of the MEMS device 100E as the fourth variant (L=4.5×L0), and a line L14 corresponds to the resonance characteristic of the horizontal torsional vibrations of the MEMS device 100B as the first variant (L=2.5×L0). Further, a line L15 in the graph of FIG. 16 corresponds to the resonance characteristic of the horizontal torsional vibrations of the MEMS device 100A as the comparative example (MEMS device without the snake beams (L=L0)).

As illustrated in FIG. 16, greater snake beam lengths tend to shift the resonance frequency toward the low frequency side and to increase the optical deflection angle. The amount of increase in optical deflection angle varies depending on the snake beam structure or on a structure devoid of snake beams. In some cases such as the second variant, the optical deflection angle is decreased. Still, the snake beam structure allows the optical deflection angle to increase when suitably arranged as in the case of the third variant. There is no hysteresis in the second variant. Further, in the third and fourth variants, the hysteresis is lowered to a level where it is barely detected. That is, the relation between the frequency of horizontal torsional vibrations and the deflection angle in the case where the frequency is increased from a low value is substantially the same as in the case where the frequency is lowered from a high value. The lower the hysteresis, the lower the possibility of the MEMS mirror leaving a resonant state even in the case where the control of the system is disturbed or in the case where the drive frequency is increased due to external disturbances. With the MEMS mirror in a non-resonant state, the optical deflection angle is reduced considerably, which is not desirable from the viewpoint of laser safety. Providing the snake beams can prevent the MEMS mirror from getting into a non-resonant state. This improves the safety of the distance measuring system emitting the laser beam.

Figure 17:
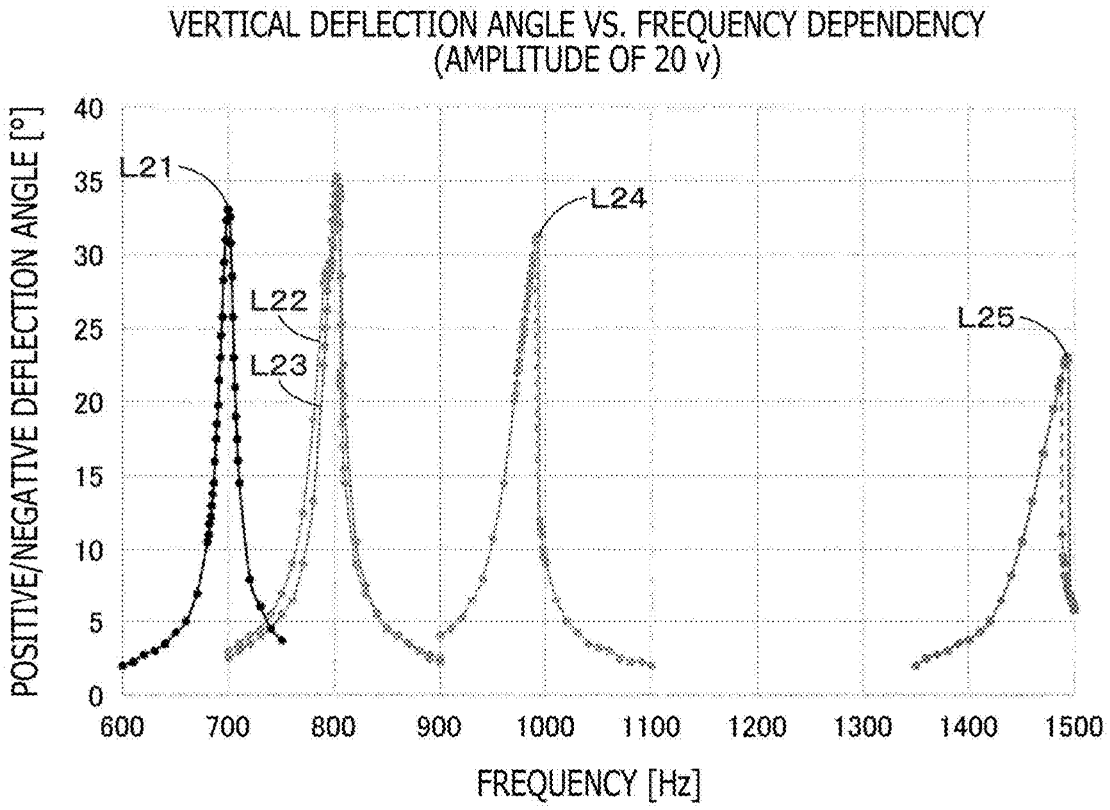
FIG. 17 is a graphic representation depicting a vertical vibration frequency versus optical deflection angle dependency regarding each of the MEMS devices of the variants.

FIG. 17 depicts the resonance characteristics of vertical torsional vibrations of each of the MEMS devices as the first through fourth variants. Solid lines stand for the case where the frequency is gradually increased from the low frequency side, and broken lines represent the case where the frequency is gradually lowered from the high frequency side. In the graph of FIG. 17, a line L21 corresponds to the resonance characteristic of the vertical torsional vibrations of the MEMS device 100E as the fourth variant (L=4.5×L0), and a line L22 corresponds to the resonance characteristic of the vertical torsional vibrations of the MEMS device 100C as the second variant (L=4.2×L0). Also, in the graph of FIG. 17, a line L23 corresponds to the resonance characteristic of the vertical torsional vibrations of the MEMS device 100D as the third variant (L=4.9×L0), and a line L24 corresponds to the resonance characteristic of the vertical torsional vibrations of the MEMS device 100B as the first variant (L=2.5×L0). Further, a line L25 in the graph of FIG. 17 corresponds to the resonance characteristic of the vertical torsional vibrations of the MEMS device 100A as the comparative example (MEMS device without the snake beams (L=L0)).

As illustrated in FIG. 17, greater snake beam lengths tend to shift the resonance frequency toward the low frequency side and to increase the optical deflection angle. There is no hysteresis in the second, third, and fourth variants. That is, the relation between the frequency of vertical torsional vibrations and the deflection angle in the case where the frequency is increased from a low value is substantially the same as in the case where the frequency is lowered from a high value. Without a hysteresis, as mentioned above, there is a reduced possibility of the MEMS mirror leaving a resonant state even in the case where the control of the system is disturbed or in the case where the drive frequency is increased due to external disturbances. With the MEMS mirror in a non-resonant state, the optical deflection angle is reduced considerably, which is not desirable from the viewpoint of laser safety. Providing the snake beams can prevent the MEMS mirror from entering a non-resonant state. This improves the safety of the distance measuring system emitting the laser beam.

It is indicated, as discussed above, that prolonging the path length L of the snake beams increases the optical deflection angle and suppresses or eliminates the hysteresis. Meanwhile, prolonging the path length L of the snake beams comes to a trade-off point where the resonance frequencies of horizontal and vertical torsional vibrations are decreased. With this trade-off taken into account, the range of the path lengths L expected to provide the benefits of the present disclosure is defined by the following formula (1):

$$1.1\times L0\leq L\leq 10.0\times L0 \qquad \text{Formula (1)}$$

In the case where, as a rule of thumb, the resonance frequency is to be half that of the case where no snake beams are provided, the range of the path lengths L should preferably be defined by the following formula (2):

$$2.0\times L0\leq L\leq 6.0\times L0 \qquad \text{Formula (2)}$$

A high-order mode of horizontal torsional vibrations appears when the frequency is twice or three times that of the above-mentioned fundamental mode. The benefits of the snake beams can also be expected in the high-order mode. The high-order mode is thus effective, for example, in the case where it is desired to increase the difference between the drive frequency of vertical torsional vibrations on one hand and the drive frequency of horizontal torsional vibrations on the other hand or in the case where higher horizontal torsional vibrations are needed to align with an application in use.

[Fifth Variation]

Figure 18:
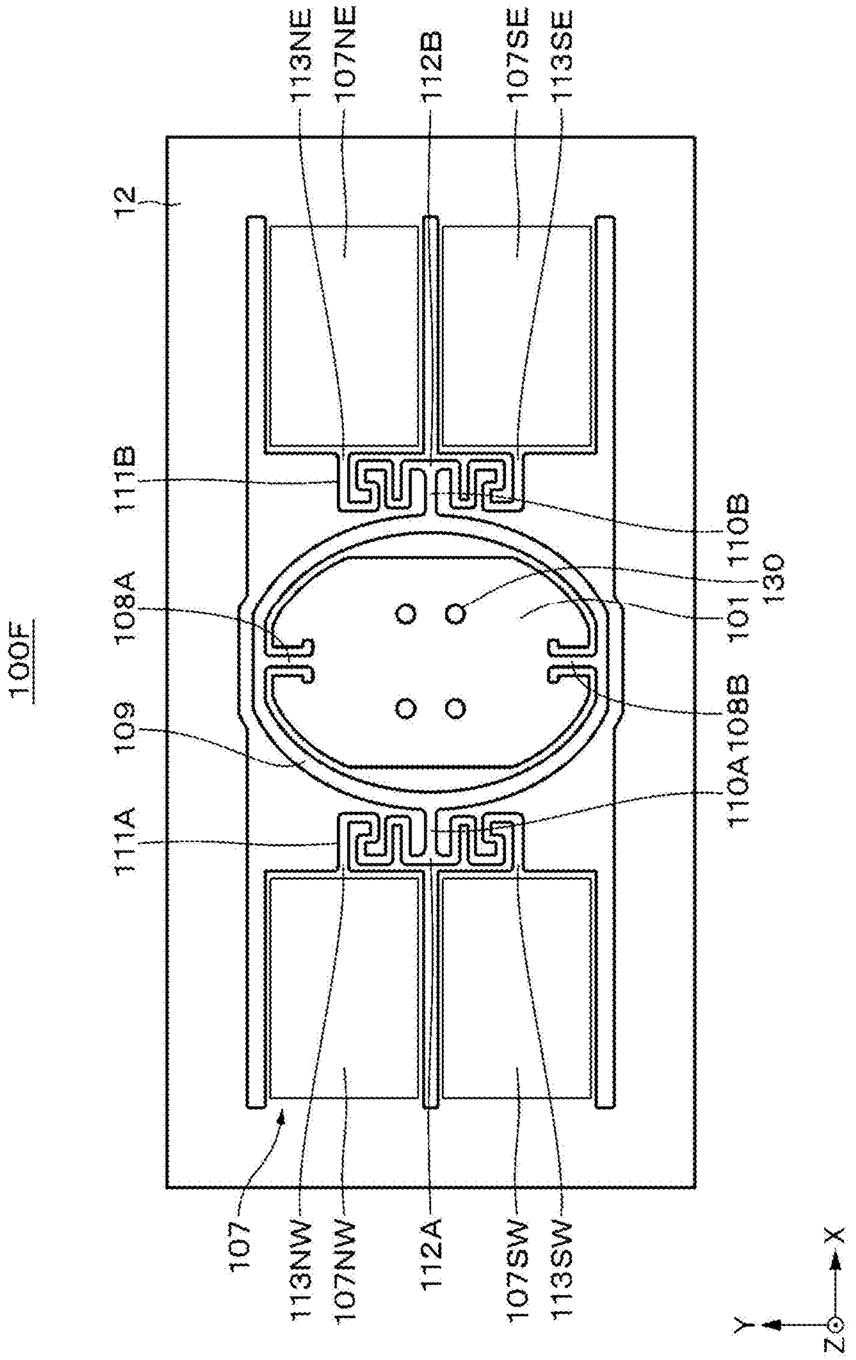
FIG. 18 is a view for explaining a MEMS device as a fifth variant.

FIG. 18 depicts a configuration example of a MEMS device (MEMS device 100F) as a fifth variant. Depending on its usage, the MEMS device may be required to suppress the noise of the mirror 101 in operation. The larger the mirror 101, the higher the noise tends to become. Hence, the MEMS device 100F has holes 130 formed in the mirror 101 as illustrated in FIG. 18. For example, four holes 130 are provided outside the region to which the incident laser beam LA1 is emitted. The holes 130 reduce a pressure difference between front and back of the mirror 101 during mirror operation, thereby lowering sound pressure and diminishing noise. The size, positions, and quantity of the holes 130 can be varied as needed. Still, there is a concern that the holes 130 reduce the effective area of the mirror 101 and thus lower reflected light intensity. With that concern taken into consideration, the entire area of the holes 130 should preferably be 10% or less of the area of the mirror 101.

[Sixth Variant]

The distance sensors to which the MEMS device described above in connection with the embodiment or its variants can be applied may operate in diverse methods. For example, the ToF method is classified into several categories. In particular, the direct time-of-flight measurement method (d-ToF) involving pulse laser emission is segmented into linear mode (LM), Geiger mode (GM), and single-photon (SP) mode (referred to respectively as the LM method, GM method, and SP method where appropriate). The LM method involves using a linear light receiving element such as an avalanche photodiode (APD) so as to ensure a suitable S/N ratio. That is, the number of measurable photons Nf is approximately between 100 and 1,000. The GM method often involves performing photon counting by use of a single-photon avalanche diode (SPAD), for example. The expected value of the number of received photons Nf in a single shot may be smaller than 1. Histogram processing is carried out by use of the number of received photons Nf accumulated in a plurality of shots. The SP method involves performing single-shot measurement by use of a silicon photomultiplier (SiPM), for example. The number of measurable photons is at least 1.

In an ideal case, the accuracies of measurement time are averaged by $1/\sqrt{N}$ based on the number of received photons Nf. For this reason, the SP method involving a small N number is more affected by the width of the laser pulse. The probability distribution of the numbers of received photons follows a normal distribution in the LM method and a Poisson distribution in the GM method and the SP method. Meanwhile, in the case of following the Poisson distribution, the time waveform of the laser pulse significantly affects the accuracy of measurement time. In particular, in the SP method involving single-shot measurement, larger pulse tails may cause the results of measurement to deviate from the actual distances. The SP method, which provides the highest utilization efficiency of light, strongly requires that the laser beam have a short pulse width and be free of pulse tails. The present disclosure can be applied to the methods described above.

Moreover, the matters described above in connection with the embodiment and its variants can be combined as needed. Also, the advantageous effects stated in this description are only examples and not limitative of the present disclosure.

The present disclosure can also adopt the following configurations:

(1)

A MEMS device including:

a mirror;

an actuator;

a first beam extending in a direction of a horizontal rotation axis and connected to the mirror;

a ring-shaped beam connected to the first beam;

a second beam extending in a direction of a vertical rotation axis and connected to the ring-shaped beam; and a third beam having a first connection part positioned substantially in the middle thereof, the third beam further having a second connection part and a third connection part positioned at both ends thereof, the third beam being connected to the second beam via the first connection part, in which both ends of the third beam are connected to the actuator individually via the second connection part and the third connection part, and, in a case where L0 denotes a minimum distance from the first connection part to the second connection part and from the first connection part to the third connection part as connected by a line substantially parallel to the horizontal rotation axis and by a line substantially parallel to the vertical rotation axis, and where N0 represents the number of bends of approximately 90 degrees each, a path length L from the first connection part to the second connection part and from the first connection part to the third connection part along the third beam is greater than L0, and the number of bends N is larger than N0.

(2)

The MEMS device according to (1), in which the number of bends N is at least 4.

(3)

The MEMS device according to (1) or (2), in which the path length L is 1.1×L0 or more but 10×L0 or less.

(4)

The MEMS device according to any one of (1) to (3), in which a relation between a horizontal torsional vibration frequency and a deflection angle in a case where the frequency is increased from a low value is substantially same as in a case where the frequency is lowered from a high value.

(5)

The MEMS device according to any one of (1) to (4), in which a relation between a vertical torsional vibration frequency and a deflection angle in a case where the frequency is increased from a low value is substantially same as in a case where the frequency is lowered from a high value.

(6)

The MEMS device according to any one of (1) to (5), in which the third beam is configured to resonate integrally with the mirror.

(7)

A distance measuring apparatus including:

a MEMS device;

a laser light source;

a light receiving section; and a measuring section configured to measure a distance to a distance measuring target on the basis of time of flight of a laser beam emitted from the laser light source, in which the MEMS device includes a mirror, an actuator, a first beam extending in a direction of a horizontal rotation axis and connected to the mirror, a ring-shaped beam connected to the first beam, a second beam extending in a direction of a vertical rotation axis and connected to the ring-shaped beam, and a third beam having a first connection part positioned substantially in the middle thereof, the third beam further having a second connection part and a third connection part positioned at both ends thereof, the third beam being connected to the second beam via the first connection part, both ends of the third beam are connected to the actuator individually via the second connection part and the third connection part, and, in a case where L0 denotes a minimum distance from the first connection part to the second connection part and from the first connection part to the third connection part as connected by a line substantially parallel to the horizontal rotation axis and by a line substantially parallel to the vertical rotation axis, and where N0 represents the number of bends of approximately 90 degrees each, a path length L from the first connection part to the second connection part and from the first connection part to the third connection part along the third beam is greater than L0, and the number of bends N is larger than N0.

(8)

The distance measuring apparatus according to (7), in which the number of bends N is at least 4.

(9)

The distance measuring apparatus according to (7) or (8), in which the path length L is 1.1×L0 or more but 10×L0 or less.

(10)

The distance measuring apparatus according to any one of (7) to (9), in which a relation between a horizontal torsional vibration frequency and a deflection angle in a case where the frequency is increased from a low value is substantially same as in a case where the frequency is lowered from a high value.

(11)

The distance measuring apparatus according to any one of (7) to (10), in which a relation between a vertical torsional vibration frequency and a deflection angle in a case where the frequency is increased from a low value is substantially same as in a case where the frequency is lowered from a high value.

(12)

The distance measuring apparatus according to any one of (7) to (11), in which the third beam is configured to resonate integrally with the mirror.

Application Examples

Some application examples of the present disclosure are explained. This disclosure is not limited to the application examples to be discussed below. The SP method using the MEMS device explained above in connection with the embodiment permits highly efficient distance measurement over a range of ten-plus centimeters to several dozen meters. Distance data can be output with a latency of 1 millisecond or less. The accuracy of distance falls within a range of a millimeter to several millimeters. The features of low power consumption and small size allow application examples below.

Figure 19:
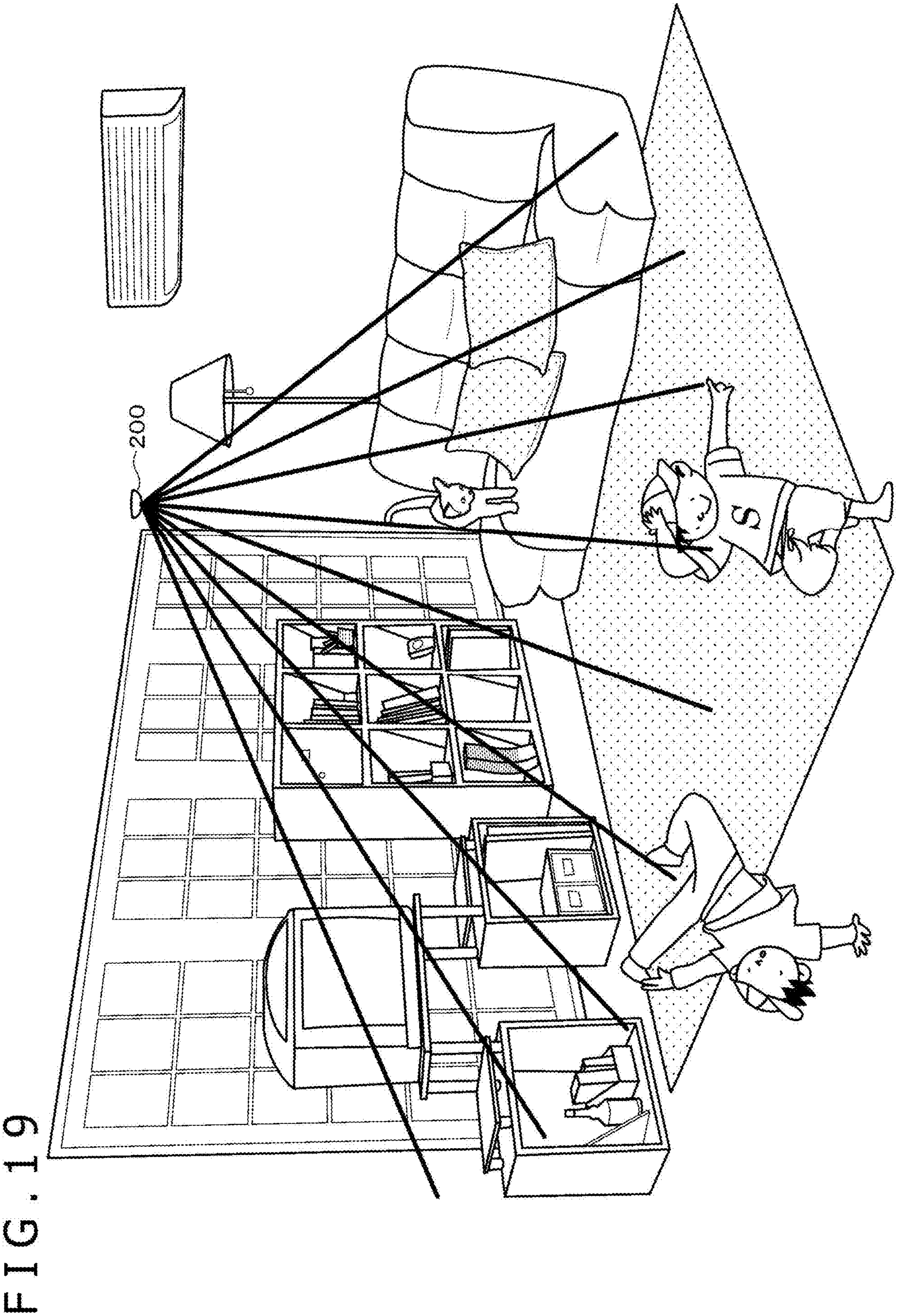
FIG. 19 is a view for explaining an application example.

For example, a distance measuring apparatus (e.g., distance measuring apparatus 200 discussed above) using the MEMS device of the present disclosure may be installed in a corner of a room as illustrated in FIG. 19. The distance measuring apparatus is capable of taking measurements of the entire room, including vigorous motions and tiny movements such as those of a person moving fingers while watching television on a sofa in the room. These capabilities of the apparatus allow persons to operate electronic equipment such as household appliances, to experience interactive video games, and to put security measures in place. Further, with very little interference between scanning type SP method-based apparatuses, a plurality of distance sensor systems may be used to perform distance measurement in at least two directions to implement 3D modeling in real time. This provides a more real interactive experience. The SP method-based apparatus can be used in the sun, providing experiences in which the setup of FIG. 19 is extended to a wider space.

Figure 20:
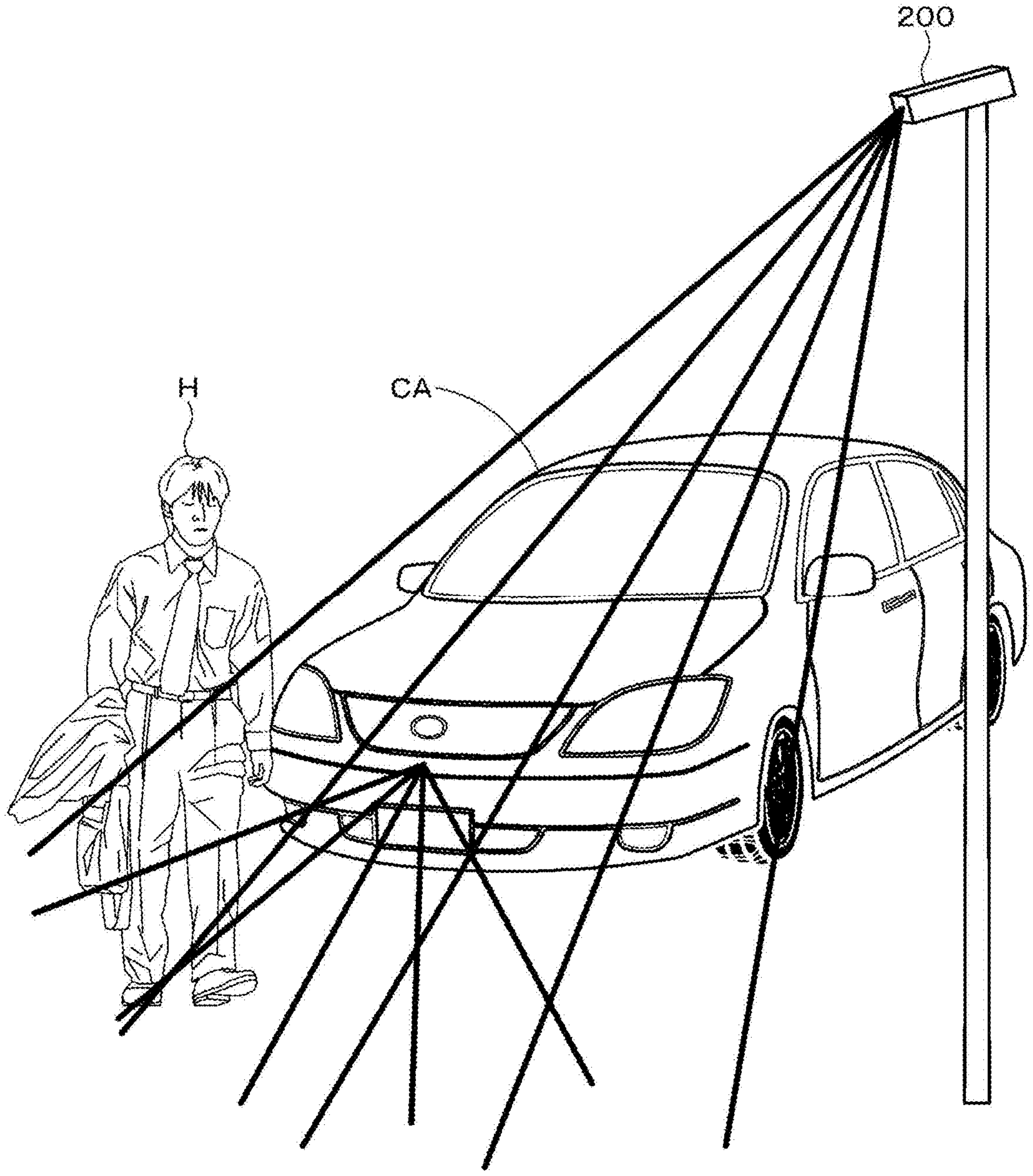
FIG. 20 is a view for explaining another application example.

FIG. 20 is a schematic view depicting an application example envisaging a scene in which the distance measuring apparatus 200 is used in downtown with people around. The SP method-based apparatus mounted in a car CA performs highly accurate distance measurement in real time, recognizing even small movements in narrow locations where there are very short distances between people, such as intersections and alleys. This not only ensures the safety of a human H but also supports smooth operation of the car CA in automated driving. The SP method-based apparatuses attached to utility poles and roadside trees can recognize very small movements of passersby and the like without hindering the flow lines of the human H. What is acquired here is point group data in real time, which can be made use of with privacy taken into consideration. For example, the acquired data may be used by information services for expecting the movements of the human H or for detecting possible crimes beforehand, or may function as an interface allowing people intentionally to operate public installations. To execute such motions requires capturing finger movements.

Figure 21:
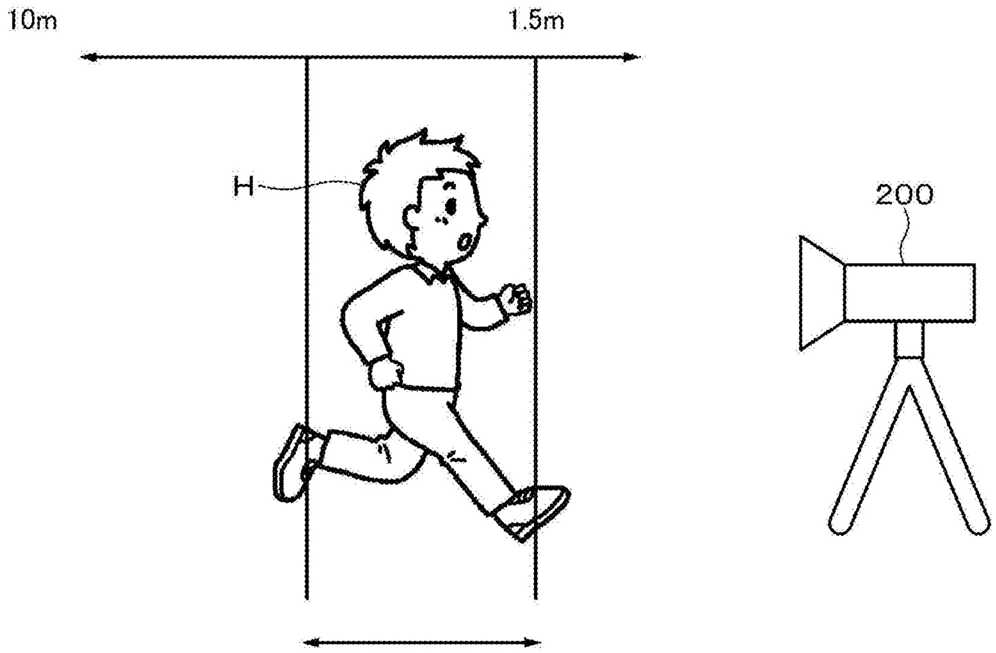
FIG. 21 is a view for explaining another application example.

FIG. 21 is a schematic view depicting an application example related to camera techniques. Mounted in a large-sized camera with a lens arrangement of a very shallow focal depth, for example, the distance measuring apparatus 200 accurately acquires the position information regarding the subject (e.g., human H) so as to calculate focal point distance and focal depth for automated lens adjustment. In addition to this example, the apparatus may be used in various kinds of equipment for automatically controlling distance. For example, the present disclosure can be applied to such cases as connection of machines, coupling of train cars, aerial refueling of aircraft, and coupling of artificial satellites.

Small-sized and low in power consumption, the distance measuring apparatus 200 can also be used by unmanned aircraft such as drones for avoiding obstacles. Many strict conditions are imposed on the drone flying in the woods or along underground roads, for example. The SP method-based apparatus permitting point group data output in real time enables the drone to fly safely at high speed. The SP method-based apparatus also excels in asset management of structures using drones. Such drones can acquire in real time a point group of 1 million points or more per second. Further, low in power consumption, drones of this type can inspect many structures in a single flight.

Figure 22:
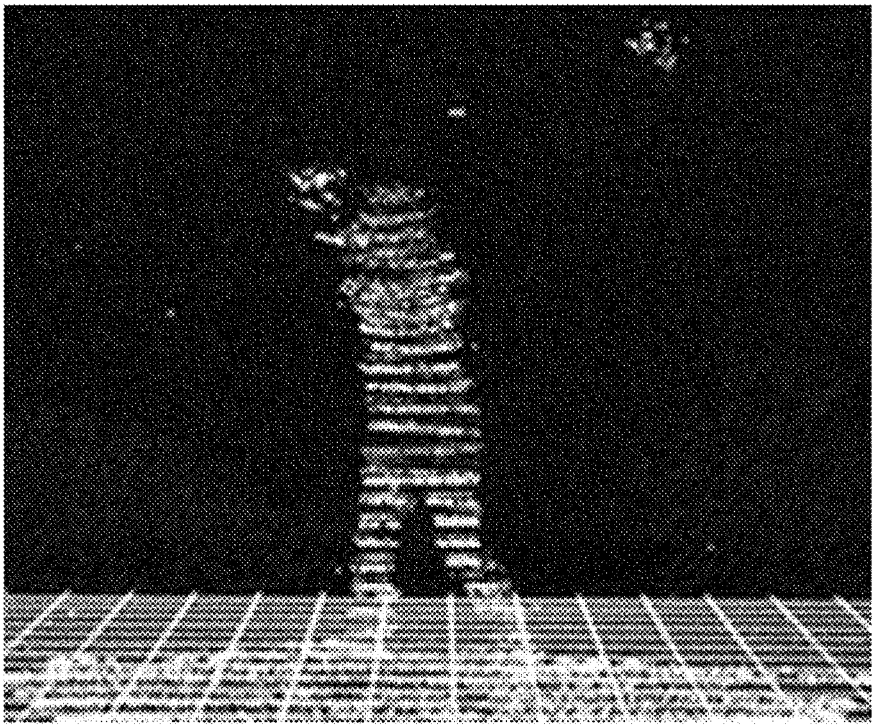
FIG. 22 is a view for explaining another application example.

The SP method-based apparatus permitting real-time measurement is highly compatible with sports. This apparatus acquiring a point group of 1 million points or more per second can capture minute movements useful for judgments in sports or for coaching, for example. In real-time interactive experiences, the apparatus digitizes sports movements that have been perceived as merely sensorial experiences. For example, wearable devices such as piezoelectric elements worn physically by people provide real-time information by the SP method, allowing the people to better understand what they do. FIG. 22 depicts an exemplary image of sports (e.g., golf) obtained in such a manner. A plurality of distance sensors enable 360-degree omnidirectional 3D modeling in real time. The sensors may be used in golf, for example, for analysis and teaching of club swing as well as for prevention of injuries. Since the sensors of this type can cover distances of up to tens of meters, they can be utilized not only in golf but also in such diverse sports as baseball, basketball, tennis, and gymnastics.

Further, the technology of the present disclosure is not limited to the above-described application examples and can also be applied to diverse products. For example, the technology of the present disclosure may be implemented as an apparatus to be mounted on any type of mobile objects including automobiles, electric vehicles, hybrid electric vehicles, motorcycles, bicycles, personal mobility devices, aircraft, drones, ships, robots, construction machines, agricultural machines (tractors), and the like.

Figure 23:
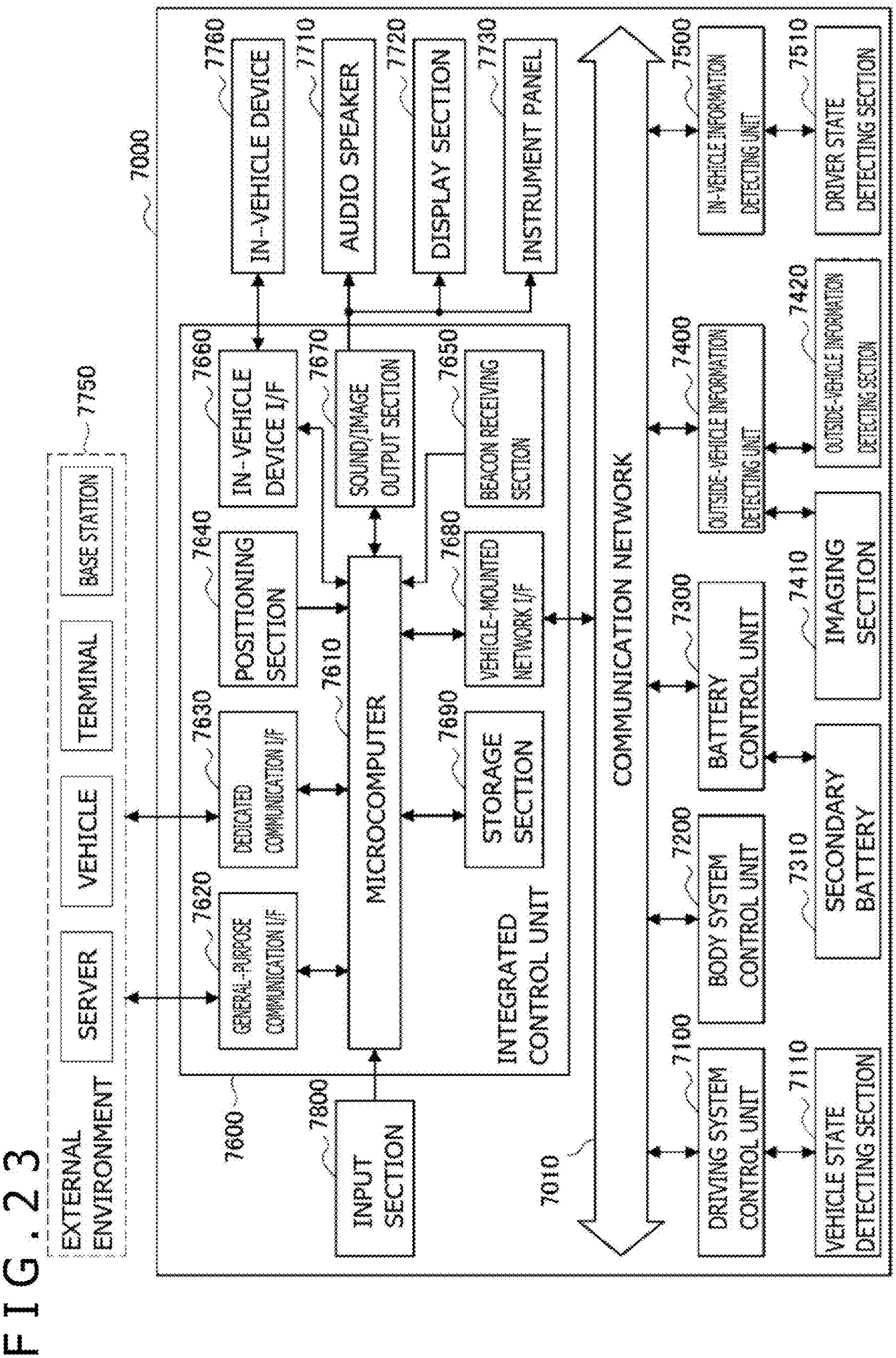
FIG. 23 is a block diagram depicting an example of schematic configuration of a vehicle control system.

FIG. 23 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 23, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 23 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 24:
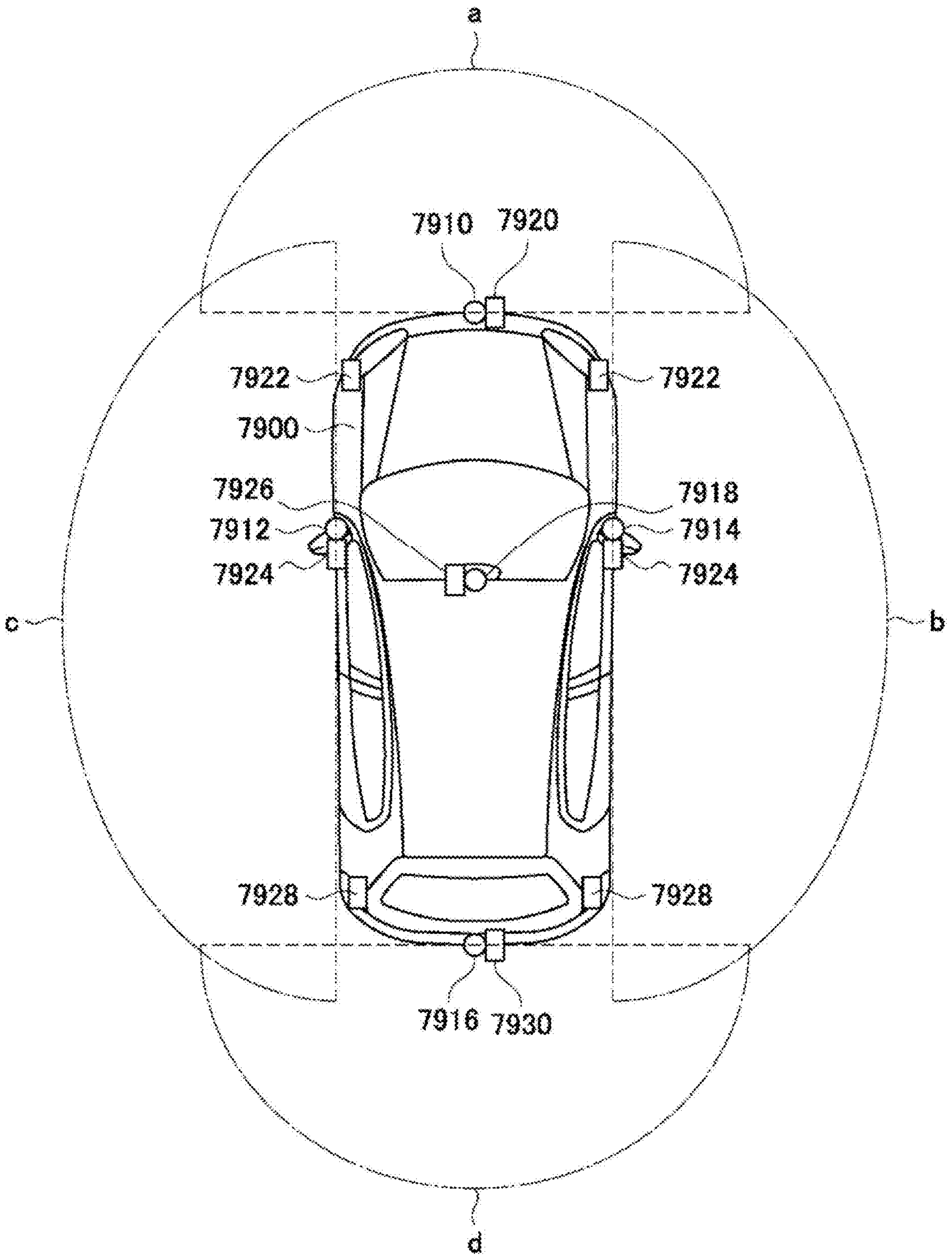
FIG. 24 is a diagram of assistance in explaining an example of installation positions of an outside-vehicle information detecting section and an imaging section.

FIG. 24 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 24 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 23, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 23, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 23 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the MEMS device or the distance measuring apparatus of the present disclosure can be applied to the outside-vehicle information detecting section, for example.

REFERENCE SIGNS LIST

100: MEMS device
101: Mirror
107: Actuator
108A, 108B: First beam
109: Ring-shaped beam
110A, 110B: Second beam
111A, 111B: Snake beam
200: Distance measuring apparatus

The invention claimed is:

1. A MEMS device comprising:
- a mirror;
- an actuator;
- a first beam extending in a direction of a horizontal rotation axis and connected to the mirror;
- a ring-shaped beam connected to the first beam;
- a second beam extending in a direction of a vertical rotation axis and connected to the ring-shaped beam; and
- a third beam having a first connection part positioned substantially in a middle thereof, the third beam further having a second connection part and a third connection part positioned at both ends thereof, the third beam being connected to the second beam via the first connection part, wherein both ends of the third beam are connected to the actuator individually via the second connection part and the third connection part, and, in a case where L0 denotes a minimum distance from the first connection part to the second connection part and from the first connection part to the third connection part as connected by a line substantially parallel to the horizontal rotation axis and by a line substantially parallel to the vertical rotation axis, and where N0 represents a number of bends of approximately 90 degrees each, a path length L from the first connection part to the second connection part and from the first connection part to the third connection part along the third beam is greater than L0, and a number of bends N is larger than N0.

2. The MEMS device according to claim 1, wherein the number of bends N is at least 4.

3. The MEMS device according to claim 1, wherein the path length L is 1.1×L0 or more but 10×L0 or less.

4. The MEMS device according to claim 1, wherein a relation between a horizontal torsional vibration frequency and a deflection angle in a case where the frequency is increased from a low value is substantially same as in a case where the frequency is lowered from a high value.

5. The MEMS device according to claim 1, wherein a relation between a vertical torsional vibration frequency and a deflection angle in a case where the frequency is increased from a low value is substantially same as in a case where the frequency is lowered from a high value.

6. The MEMS device according to claim 1, wherein the third beam is configured to resonate integrally with the mirror.

7. A distance measuring apparatus comprising:

a MEMS device;

a laser light source;

a light receiving section; and a measuring section configured to measure a distance to a distance measuring target on a basis of time of flight of a laser beam emitted from the laser light source, wherein the MEMS device includes a mirror, an actuator, a first beam extending in a direction of a horizontal rotation axis and connected to the mirror, a ring-shaped beam connected to the first beam, a second beam extending in a direction of a vertical rotation axis and connected to the ring-shaped beam, and a third beam having a first connection part positioned substantially in a middle thereof, the third beam further having a second connection part and a third connection part positioned at both ends thereof, the third beam being connected to the second beam via the first connection part, both ends of the third beam are connected to the actuator individually via the second connection part and the third connection part, and, in a case where L0 denotes a minimum distance from the first connection part to the second connection part and from the first connection part to the third connection part as connected by a line substantially parallel to the horizontal rotation axis and by a line substantially parallel to the vertical rotation axis, and where N0 represents a number of bends of approximately 90 degrees each, a path length L from the first connection part to the second connection part and from the first connection part to the third connection part along the third beam is greater than L0, and a number of bends N is larger than N0.

8. The distance measuring apparatus according to claim 7, wherein the number of bends N is at least 4.

9. The distance measuring apparatus according to claim 7, wherein the path length L is 1.1×L0 or more but 10×L0 or less.

10. The distance measuring apparatus according to claim 7, wherein a relation between a horizontal torsional vibration frequency and a deflection angle in a case where the frequency is increased from a low value is substantially same as in a case where the frequency is lowered from a high value.

11. The distance measuring apparatus according to claim 7, wherein a relation between a vertical torsional vibration frequency and a deflection angle in a case where the frequency is increased from a low value is substantially same as in a case where the frequency is lowered from a high value.

12. The distance measuring apparatus according to claim 7, wherein the third beam is configured to resonate integrally with the mirror.

* * * * *